US010048837B2

(12) United States Patent
Lu et al.

(10) Patent No.: US 10,048,837 B2
(45) Date of Patent: Aug. 14, 2018

(54) TARGET SELECTION ON A SMALL FORM FACTOR DISPLAY

(71) Applicant: Google Inc., Mountain View, CA (US)

(72) Inventors: Hao Lu, Sunnyvale, CA (US); Uran Oh, College Park, MD (US); Yang Li, Palo Alto, CA (US)

(73) Assignee: Google LLC, Mountain View, CA (US)

(*) Notice: Subject to any disclaimer, the term of this patent is extended or adjusted under 35 U.S.C. 154(b) by 243 days.

(21) Appl. No.: 15/045,135

(22) Filed: Feb. 16, 2016

(65) Prior Publication Data
US 2017/0235439 A1 Aug. 17, 2017

(51) Int. Cl.
G06F 3/041 (2006.01)
G06F 3/0488 (2013.01)
G06F 3/0482 (2013.01)
G06F 3/0484 (2013.01)
G06F 3/0481 (2013.01)

(52) U.S. Cl.
CPC ........ G06F 3/0482 (2013.01); G06F 3/04817 (2013.01); G06F 3/04842 (2013.01); G06F 3/04845 (2013.01); G06F 3/04886 (2013.01)

(58) Field of Classification Search
CPC . G06F 3/0482; G06F 3/04883; G06F 3/04817
See application file for complete search history.

(56) References Cited

U.S. PATENT DOCUMENTS

| 6,448,987 B1* | 9/2002 | Easty | G06F 3/0482 715/834 |
|---|---|---|---|
| 6,556,222 B1 | 4/2003 | Narayanaswami | |
| 7,036,091 B1* | 4/2006 | Nguyen | G06F 3/0482 348/E5.002 |
| 8,910,078 B2 | 12/2014 | Sweeney et al. | |

(Continued)

FOREIGN PATENT DOCUMENTS

| WO | 2015000382 A1 | 1/2015 |
| WO | 2015034965 A1 | 3/2015 |

OTHER PUBLICATIONS

Martonik., "How to turn off 'app suggestions' in the Google Now Launcher," Android Central, Dec. 15, 2015, 5 pp.

(Continued)

Primary Examiner — Jordany Nunez
(74) Attorney, Agent, or Firm — Shumaker & Sieffert, P.A.

(57) ABSTRACT

A method may include identifying, from a set of applications, a subset of the set of applications, each application from the subset of the set of applications being predicted, by a computing device, to be selected by a user. The method may also include outputting a graphical user interface that includes: a plurality of application icons representing the set of applications and positioned around at least a portion of a perimeter of the graphical user interface; and a plurality of prediction icons positioned within an interior of the graphical user interface and representing the subset of the set of applications. The position of a particular prediction icon (Continued)

representing a particular application may be based on a position of a particular application icon representing the particular application. The method may further include executing an action associated with the particular prediction icon or the one of the plurality of application icons.

19 Claims, 6 Drawing Sheets

(56) References Cited

U.S. PATENT DOCUMENTS

| | | | |
|---|---|---|---|
| 2003/0197740 A1* | 10/2003 | Reponen | G06F 3/0362 715/810 |
| 2006/0112347 A1 | 5/2006 | Baudisch | |
| 2007/0016572 A1* | 1/2007 | Bates | G06F 3/0236 |
| 2008/0163118 A1* | 7/2008 | Wolf | G06Q 10/107 715/835 |
| 2009/0327963 A1 | 12/2009 | Mouilleseaux et al. | |
| 2010/0299637 A1 | 11/2010 | Chmielewski et al. | |
| 2011/0055739 A1* | 3/2011 | MacFarlane | G01C 21/3664 715/764 |
| 2013/0097550 A1 | 4/2013 | Grossman et al. | |
| 2013/0285931 A1* | 10/2013 | Engdahl | G06F 3/0488 345/173 |
| 2014/0109002 A1* | 4/2014 | Kimball | G06F 3/04842 715/800 |
| 2014/0111487 A1* | 4/2014 | Wang | G06F 3/0418 345/178 |
| 2014/0201655 A1 | 7/2014 | Mahaffey et al. | |
| 2017/0109011 A1 | 4/2017 | Jiang | |

OTHER PUBLICATIONS

International Search Report and Written Opinion of International Application No. PCT/US2016/068303, dated Apr. 6, 2017, 15 pp.
Bailly et al., "Model of Visual Search and Selection Time in Linear Menus", CHI'14, Apr. 26-May 1, 2014, 10 pgs.
Benjamin B. Bederson, "Fisheye Menus", University of Maryland, 2000, 9 pgs. Applicant points out, in accordance with MPEP 609.04(a), that the year of publication, 2000, is sufficiently earlier than the effective U.S. filing date, Feb. 16, 2016, so that the particular month of publication is not in issue.
Cockburn et al., "A Predictive Model of Menu Performance", CHI 2007 Proceedings-Empirical Models, Apr. 28-May 3, 2007, 10 pgs.
Findlater et al., "Impact of Screen Size on Performance, Awareness, and User Satisfaction With Adaptive Graphical User Interfaces", CHI 2008, Apr. 5-10, 2008, 10 pgs.
Paul M. Fitts, "The Information Capacity of the Human Motor System in Controlling the Amplitude of Movement", APA Centennial Feature, Journal of Experimental Psychology: General 1992, vol. 121, No. 3, 262-269, 8 pgs.
Gajos et al., "Predictability and Accuracy in Adaptive User Interfaces", Proc. CHI 2008, Apr. 5-10, 2008, 4 pgs.
Jain et al., "User Learning and Performance with Bezel Menus", Session: Phone Fun: Extending Mobile Interaction, CHI 2012, May 5-10, 2012, 10 pgs.
Narayanaswami et al., "Application design for a smart watch with a high resolution display", 2000 IEEE, 8 pgs. Applicant points out, in accordance with MPEP 609.04(a), that the year of publication, 2000, is sufficiently earlier than the effective U.S. filing date, Feb. 16, 2016, so that the particular month of publication is not in issue.
Yang et al., "TouchCuts and TouchZoom: Enhanced Target Selection for Touch Displays using Finger Proximity Sensing", CHI 2011 Session: Touch 3: Sensing, May 7-12, 2011, 10 pgs.
Ziebart et al., "Probabilistic Pointing Target Prediction via Inverse Optimal Control", IUI'12, Feb. 14-17, 2012, 10 pgs.
Gear & Gadgets/Product News & Review, Samsung Gear S2 hands-on: Svelte design and brilliant rotating bezel, Retrieved from http://arstechnica.com/gadgets/2015/09/samsung-gear-s2-hands-on-svelte-design-and-a-brilliant-rotating-bezel/ on Nov. 12, 2015, 3 pgs.
Dan Seifert, The Verge, Samsung Gear S2 review: A clinic on what a smartwatch should be, Retrieved from http://www.theverge.com/2015/10/13/9519033/samsung-gear-s2-watch-review on Nov. 12, 2015, 11 pgs.

* cited by examiner

TARGET SELECTION ON A SMALL FORM FACTOR DISPLAY

BACKGROUND

Some computing devices are configured to output a graphical user interface that includes icons representing applications installed on the computing device. A computing device may receive an indication of user input to select an application icon that causes the computing device to execute an action associated with the application icon. For instance, selecting an application icon may cause the computing device to launch an application corresponding to the application icon.

Some computing devices include numerous applications and relatively small screens, which may make it difficult for a user to select a particular icon. For example, a computing device may display icons for all of the applications installed on the computing device at one time, such that the computing device outputs very small icons. Alternatively, a computing device may display a smaller number of larger icons at one time, such that a user must scroll through several screens to select a particular icon. In either case, a user may spend substantial amounts of time and effort trying to locate and select a particular icon, which may diminish the user experience.

SUMMARY

In some examples, a method may include identifying, by a computing device and from a set of applications, a subset of the set of applications, each application from the subset of the set of applications being predicted, by the computing device, to be selected by a user. The method may also include outputting, by the computing device and for display, a graphical user interface. The graphical user interface may include a plurality of application icons representing the set of applications, wherein: each respective application icon from the plurality of application icons represents a respective application from the set of applications, and the plurality of application icons is positioned around at least a portion of a perimeter of the graphical user interface. The graphical user interface may also include a plurality of prediction icons positioned within an interior of the graphical user interface, wherein: the interior of the graphical user interface is bounded by the perimeter of the graphical user interface, the plurality of prediction icons represent the subset of the set of applications, each respective prediction icon from the plurality of prediction icons represents a respective application from the subset of the set of applications, and a position of a particular prediction icon representing a particular application from the subset of the set of applications is based on a position of a particular application icon from the set of application icons representing the particular application. The method may further include responsive to receiving an indication of user input to select the particular prediction icon or one of the plurality of application icons, executing, by the computing device, an action associated with the particular prediction icon or the one of the plurality of application icons.

In another example, a computing device may include one or more computer processors and a memory. The memory may include instructions that when executed by the one or more computer processors cause the one or more computer processors to: identify, from a set of applications, a subset of the set of applications, each application from the subset of the set of applications being predicted by the computing device to be selected by a user; and output, for display, a graphical user interface. The graphical user interface may include a plurality of application icons representing the set of applications, wherein: each respective application from the plurality of application icons represent a respective application from the set of applications, and the plurality of application icons is positioned around at least a portion of a perimeter of the graphical user interface. The graphical user interface may also include a plurality of prediction icons positioned within an interior of the graphical user interface, wherein: the interior of the graphical user interface is bounded by the perimeter of the graphical user interface, the plurality of prediction icons represent the subset of the set of applications, each respective prediction icon from the plurality of prediction icons represents a respective application from the subset of the set of applications, and a position of a particular prediction icon representing a particular application from the subset of the set of applications is based on a position of a particular application icon from the set of application icons representing the particular application. The memory may also include instructions that when executed by the one or more computer processors cause the one or more computer processors to responsive to receiving an indication of user input to select the particular prediction icon or one of the plurality of application icons, execute an action associated with the particular prediction icon or the one of the plurality of application icons.

In another example, a non-transitory computer-readable storage medium may include instructions that, when executed, cause at least one processor of a computing device to identify, from a set of content elements, a subset of the set of content elements, each content element from the subset of the set of content elements being predicted, by the computing device, to be selected by a user; and output, for display, a graphical user interface. The graphical user interface may include a plurality of base icons representing the set of content elements, wherein: each respective base icon from the plurality of base icons represents a respective content element from the set of content elements, and the plurality of base icons is positioned around at least a portion of a perimeter of the graphical user interface. The graphical user interface may also include a plurality of prediction icons positioned within an interior of the graphical user interface, wherein: the interior of the graphical user interface is bounded by the perimeter of the graphical user interface, the plurality of prediction icons represent the subset of the set of content elements, each respective prediction icon from the plurality of prediction icons represents a respective content element from the subset of the set of content elements, and a position of a particular prediction icon representing a particular content element from the subset of the set of content elements is based on a position of a particular base icon from the set of base icons representing the particular content element. The non-transitory computer-readable storage medium may include instructions that, when executed, cause at least one processor of a computing device to responsive to receiving an indication of user input to select the particular prediction icon or one of the plurality of base icons, execute an action associated with the particular prediction icon or the one of the plurality of base icons.

The details of one or more examples are set forth in the accompanying drawings and the description below. Other features, objects, and advantages of the disclosure will be apparent from the description and drawings, and from the claims.

DETAILED DESCRIPTION

In general, techniques of this disclosure may enable a computing device, such as a smartwatch, to output icons associated with applications that are likely to be selected by a user. For example, a computing device may include a set of applications from which the computing device may predict a subset of applications that a user is likely to select. The computing device may output an application icon for each application in the set of applications, such that the application icons are located at predefined positions around the perimeter of the graphical user interface. By positioning the application icons at predefined locations near the perimeter of the graphical user interface, a user of the computing device may more easily recall where the icon is located with repeated use of the computing device. The computing device may also output a prediction icon for each of the applications in the subset of applications that the computing device has predicted to be selected by the user. The computing device may position the prediction icons interior to the application icons that are positioned around the perimeter of the graphical user interface, such that a user of the computing device is more likely to see the prediction icons and may easily select a prediction icon to access its corresponding application. In some examples, the prediction icons are larger than the corresponding application icons.

Because each prediction icon corresponds to one of the application icons, a particular application may be represented by two icons contemporaneously displayed within the graphical user interface. A computing device implementing techniques of the disclosure may position the prediction icons near the corresponding application icons by performing multivariate minimization of the respective distances between the prediction icons and their respective application icons. Because the locations of the application icons may be predefined within the graphical user interface, the techniques may enable a user to more quickly identify a location of a given application icon. By positioning a prediction icon near the application icon based on the multivariate minimization, a user may more quickly select the prediction icon for the application that is associated with the corresponding application icon. In this way, a user may select the prediction icon without searching through a large set of icons or incorrectly selecting an icon from a set of very small icons. As a result, the computing device may reduce the number of incorrect selections and/or reduce the amount of user effort required to find the intended application, thereby improving the user experience for the computing device.

Figure 1:
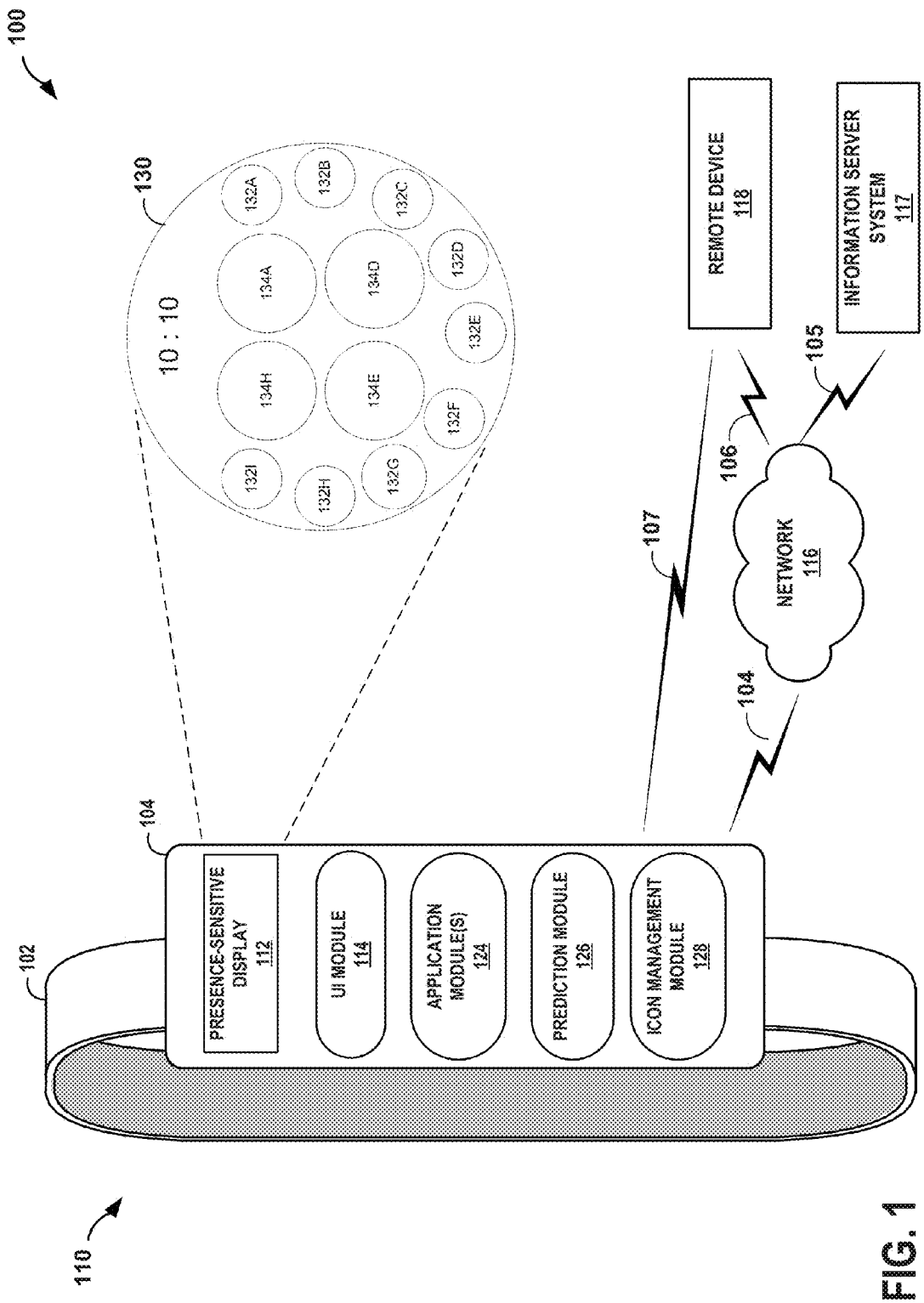
FIG. 1 is a conceptual diagram illustrating an example system for outputting prediction icons at a graphical user interface, in accordance with one or more aspects of the present disclosure.

FIG. 1 is a conceptual diagram illustrating an example system 100 for outputting prediction icons at a graphical user interface, in accordance with one or more aspects of the present disclosure. System 100 may include computing device 110, information server system (ISS) 117, and remote device 118 that are communicatively coupled via network 116.

Remote device 118 is one example of a computing device, such as a smartphone, a computerized wearable device (e.g., a watch, eyewear, ring, necklace, etc.), speaker, television, automobile, or any other type of computing device configured to send and receive information via a network, such as network 116. Remote device 118 may include one or more applications such as media applications (e.g., music, video, or the like), messaging applications (e.g., email, text, or the like), or any other type of application. Remote device 118 may exchange information with computing device 110 via network 116. For example, remote device 118 may send information to computing device 110 and may receive information from computing device 110. Remote device 118 may also exchange information with computing device 110 without traversing network 116, for example, using direct link 107. Direct link 107 may be any communication protocol or mechanism capable of enabling two computing devices to communicate directly (i.e., without requiring a network switch, hub, or other intermediary network device), such as Bluetooth®, Wi-Fi Direct®, near-field communication, etc.

ISS 117 represents any suitable remote computing system, such as one or more desktop computers, laptop computers, mainframes, servers, cloud computing systems, etc. capable of sending and receiving information both to and from a network, such as network 116. ISS 117 may host applications and data for contextual information, music, weather information, traffic information, messaging information (e.g., email, SMS), calendar information, social media, news, etc. ISS 117 may represent a cloud computing system that provides information through network 116 computing device 110 and/or remote device(s) 118, which may output at least a portion of the information provided by ISS 117 to a user.

Network 116 represents any public or private communications network, for instance, cellular, Wi-Fi, and/or other types of networks, for transmitting data between computing systems, servers, and computing devices. Network 116 may include one or more network hubs, network switches, network routers, or any other network equipment, that are operatively inter-coupled thereby providing for the exchange of information between computing device 110, ISS 117, and remote device 118. Computing device 110, ISS 117, and remote device 118, may transmit and receive data across network 116 using any suitable communication techniques. For example, ISS 117 may exchange data with computing device 110 via a cellular network and computing device 110 may exchange data with remote device 118 via Wi-Fi.

Computing device 110, ISS 117, and remote device 118 may each be operatively coupled to network 116 using respective network links 104, 105, and 106. Computing device 110, ISS 117, and remote device 118 may be operatively coupled to network 116 using a different network link. The links coupling computing device 110, ISS 117, remote device 118 to network 116 may be Ethernet, ATM or other types of network connections, and such connections may be wireless and/or wired connections.

As shown in FIG. 1, computing device 110 may be a computerized watch, also referred to as a smartwatch. In some examples, computing device 110 may represent a mobile device, such as a smartphone, a tablet computer, a laptop computer, computerized eyewear, computerized gloves, or any other type of portable computing device. Additional examples of computing device 110 include desktop computers, televisions, personal digital assistants (PDA), portable gaming systems, media players, e-book readers, mobile television platforms, automobile navigation and entertainment systems, or any other types of wearable and non-wearable computing device.

As shown in FIG. 1, in some examples, computing device 110 may include attachment component 102 and electrical housing 104. Attachment component 102 may include a physical portion of a computing device that comes in contact with a body (e.g., tissue, muscle, skin, hair, clothing, etc.) of a user if the user is wearing computing device 110 (though, in some examples, portions of housing 104 may also come in contact with the body of the user). For example, in cases where computing device 110 is a watch, attachment component 102 may be a watch band that fits around a user's wrist and comes in contact with the skin of the user. In examples where computing device 110 is eyewear or headwear, attachment component 102 may be a portion of the frame of the eyewear or headwear that fits around a user's head. If computing device 110 is a glove, attachment component 102 may be the material of the glove that conforms to the fingers and hand of the user. In some examples, computing device 110 can be grasped and held from housing 104 and/or attachment component 102. In some examples, housing 104 may include a physical portion of computing device 110 that houses a combination of hardware, software, firmware, and/or other electrical components of computing device 110. However, in some examples, attachment component 102 may also include a portion of hardware, software, firmware, or other electrical components of computing device 110.

As illustrated in FIG. 1, housing 104 may include presence-sensitive display 112, UI module 114, one or more application modules 124, prediction module 126, and icon management module 128. Modules 114, 124, 126, and 128 may perform operations described using software, hardware, firmware, or a mixture of hardware, software, and firmware residing in and/or executing at computing device 110. Computing device 110 may execute modules 114, 124, 126, and 128 with multiple processors or multiple devices. Computing device 110 may execute modules 114, 124, 126, and 128 as virtual machines executing on underlying hardware. Modules 114, 124, 126, and 128 may execute as one or more services of an operating system or computing platform. Modules 114, 124, 126, and 128 may execute as one or more executable programs at an application layer of a computing platform.

Presence-sensitive display 112 of computing device 110 may function as an input device for computing device 110 and as an output device. Presence-sensitive display 112 may be implemented using various technologies. For instance, presence-sensitive display 112 may function as an input device using a presence-sensitive input component, such as a resistive touchscreen, a surface acoustic wave touchscreen, a capacitive touchscreen, a projective capacitance touchscreen, a pressure-sensitive screen, an acoustic pulse recognition touchscreen, or another presence-sensitive display technology. Presence-sensitive display 112 may function as an output (e.g., display) device using any one or more display components, such as a liquid crystal display (LCD), dot matrix display, light emitting diode (LED) display, organic light-emitting diode (OLED) display, e-ink, or similar monochrome or color display capable of outputting visible information to a user of computing device 110.

Presence-sensitive display 112 may receive tactile input from a user of respective computing device 110. Presence-sensitive display 112 may receive indications of tactile input by detecting one or more gestures from a user (e.g., the user touching or pointing to one or more locations of presence-sensitive display 112 with a finger or a stylus pen). Presence-sensitive display 112 may output information to a user as a graphical user interface (e.g., user interface 130), which may be associated with functionality provided by computing device 110. For example, presence-sensitive display 112 may present various user interfaces (e.g., user interface 130) related to sets of icons (e.g., icons associated with a set of applications, contacts, bookmarks, songs, etc.) or other features of computing platforms, operating systems, applications, and/or services executing at or accessible from computing device 110 (e.g., multimedia applications, electronic message applications, Internet browser applications, mobile or desktop operating systems, etc.).

UI module 114 manages user interactions with presence-sensitive display 112 and other components of computing device 110. UI module 114 may cause presence-sensitive display 112 to output a user interface for display, such as the user interface illustrated by user interface 130, as a user of computing device 110 views output and/or provides input at presence-sensitive display 112. UI module 114 may receive one or more indications of input from a user as the user interacts with the user interfaces at different times and when the user and computing device 110 are at different locations. UI module 114 may interpret inputs detected at presence-sensitive display 112 and may relay information about the detected inputs to one or more associated platforms, operating systems, applications, and/or services executing at computing device 110, for example, to cause computing device 110 to perform functions.

UI module 114 may receive information and instructions from one or more associated platforms, operating systems, applications, and/or services executing at computing device 110 and/or one or more remote computing systems, such as ISS 117 and/or remote device 118. In addition, UI module 114 may act as an intermediary between the one or more associated platforms, operating systems, applications, and/or services executing at computing device 110, various output devices of computing device 110 (e.g., speakers, LED indicators, audio or electrostatic haptic output device, etc.) to produce output (e.g., a graphic, a flash of light, a sound, a haptic response, etc.) with computing device 110.

Application modules 124 represent all the various individual applications and services executing at computing device 110. A user of computing device 110 may interact with an interface (e.g., a graphical user interface) associated with one or more application modules 124 to cause computing device 110 to perform a function. Numerous examples of application modules 124 may exist and include, a fitness application, a calendar application, a personal assistant or prediction engine, a search application, a map or navigation application, a transportation service application (e.g., a bus or train tracking application), a social media application, a game application, an e-mail application, a messaging application, an Internet browser application, or any and all other applications that may execute at computing device 110.

Icon management module 128 may cause computing device 110 to output a plurality of application icons 132A-132I (collectively, application icons 132) associated with the set of application modules 124. For purposes of illustration only, the example graphical user interface illustrated by user interface 130 in FIG. 1 includes nine application icons 132. However, it is to be understood that the graphical user interface may include additional or fewer application icons. Further, application icons 132 are not necessarily drawn to scale. In some examples, an icon may refer to a graphical representation of an application. In some instances, an icon may also be referred to as a shortcut. Selecting an icon may cause computing device 110 to execute an action associated with the application. For example, selecting a particular icon may cause computing device 110 to launch an application, output a contextual menu associated with the application, etc.

Icon management module 128 may cause presence-sensitive display 112 to output the plurality of application icons 132 such that the plurality of application icons 132 is positioned around at least a portion of the perimeter of the graphical user interface. In some instances, icon management module 128 may cause presence-sensitive display 112 to output the plurality of application icons 132 around only a portion of the perimeter of the graphical user interface. Consider an example where the graphical user interface is circular such that a position of the graphical user interface may be described with reference to an hour on analog clock face. For instance, in the example shown by user interface 130 as illustrated in FIG. 1, the graphical user interface is circular and computing device 110 includes nine application modules 124 represented by application icons 132. Icon management module 128 may cause a first application icon 132A to be displayed at the 2 o'clock position, a second application icon 132B to be displayed at the 3 o'clock position, and so on, such that a ninth application icon 132I may be displayed at the 10 o'clock position. In this example, application icons 132 will be displayed around only a portion of the graphical user interface such that the portion of the graphical user interface between the 11 o'clock position and the 1 o'clock position does not include application icons 132.

However, in some instances, icon management module 128 may cause presence-sensitive display 112 to output each of the plurality of application icons 132 around the entire perimeter of the graphical user interface. In some instances, icon management module 128 may cause presence-sensitive display 112 to output application icons 132 approximately equidistant from one another. For example, if computing device 110 includes 12 application modules 124 each represented by a different application icon 132, icon management module 128 may cause a first application icon to be displayed at the 1 o'clock position, a second application icon to be displayed at the 2 o'clock position, and so on. Likewise, if computing device 110 includes six application modules 124 each represented by a different application icon, icon management module 128 may cause a first application icon to be displayed at the 1 o'clock position, a second application icon to be displayed at the 3 o'clock position, and so on. However, in other instances, icon management module 128 may cause presence-sensitive display 112 to output application icons 132 at positions that are not equidistant from one another. For instance, in an example where computing device 110 includes six application modules 124, icon management module 128 may cause presence-sensitive display 112 to output three application icons 132 near the 9 o'clock position and three application icons near the 3 o'clock position.

In some examples, icon management module 128 may cause presence-sensitive display 112 to output each of the application icons 132 at a predefined position of the graphical user interface. In some examples, the predefined position may be hard coded. However, in other examples, the predefined position may be programmatically defined. For instance, the application icons may be arranged alphabetically or by date installed. The position of application icons 132 may remain at the predefined position until another application is installed or an existing application is removed. If another application is installed, icon management module 128 may update the predefined position to a new predefined position for each application icon 132, for example, by shifting the position of the previous application icons 132 slightly closer together to make room for the new application icon 132. Similarly, if an application is uninstalled, icon management module 128 may update the predefined position to a new predefined position for each application icon 132 by shifting the remaining application icons 132 slightly further apart.

Prediction module 126 may identify one or more applications that are likely to be selected by a user. For instance, prediction module 126 may predict which applications are likely to be selected by a user, where the predicted applications may constitute a subset of the set of applications. In some examples, prediction module 126 may identify the applications that are likely to be selected based on history information. For instance, prediction module 126 may predict which applications the user is likely to select based on the most recently used applications or most frequently used applications. In some examples, prediction module 126 may identify the applications that are likely to be used based on a degree of relatedness between applications. For instance, if a user recently used a social media application, prediction module 126 may predict that the user is likely to select other social media applications next.

In some examples, prediction module 126 may predict which applications the user is likely to select based on contextual information. Contextual information may include information associated with users of computing devices and may be stored at computing device 110, ISS 117, and/or remote device 118. When computing devices store contextual information associated with individual users or when the information is genericized across multiple users, all personally-identifiable-information such as name, address, telephone number, and/or e-mail address linking the information back to individual people may be removed before being stored. Computing device 110, ISS 117, and/or remote device 118 may further encrypt the information to prevent access to any information stored therein. In addition, computing devices may only store information associated with users of computing devices if those users affirmatively consent to such collection of information. The computing devices may further provide opportunities for users to withdraw consent and in which case, the computing devices may cease collecting or otherwise retaining the information associated with that particular user.

As used throughout the disclosure, the term "contextual information" is used to describe information that can be used by a computing system and/or computing device, such as computing device 110 or ISS 117, to define one or more environmental characteristics associated with computing devices and/or users of computing devices. In other words, contextual information represents any data that can be used by a computing device and/or computing system to determine a "user context" indicative of the circumstances that form the experience the user undergoes (e.g., virtual and/or physical) for a particular location at a particular time. Examples of contextual information include past, current, and future physical locations, degrees of movement, magnitudes of change associated with movement, weather conditions, traffic conditions, patterns of travel, patterns of movement, application usage, calendar information, purchase histories, Internet browsing histories, and the like. Contextual information may also include communication information such as information derived from e-mail messages, text messages, voice mail messages or voice conversations, calendar entries, task lists, social media network related information, and any other information about a user or computing device that can support a determination of a user context.

In some examples, prediction module 126 may determine which application a user is likely to select based on a combination of historical information, related applications, and/or contextual information. For example, where contextual information includes the day of the week, prediction module 126 may determine that user history indicates a user is more likely to select a first subset of applications during the weekday and a different, second subset of applications during the weekend. Similarly, where contextual information includes geographic location, prediction module 126 may determine that a user is more likely to select a first subset of applications while at home and a different, second subset of applications while on at work.

Icon management module 128 may cause presence-sensitive display 112 to output one or more prediction icons 134 representing the predicted subset of applications. In some examples, each prediction icon 134 may be positioned within the interior of the graphical user interface. In other words, prediction icons 134 may be bounded the perimeter of the graphical user interface. For example, as shown by user interface 130 of FIG. 1, prediction icons 134 are arranged within the interior of the graphical user interface. Each prediction icon 134 may correspond to a respective application icon 132. Each prediction icon 134 and the corresponding application icon 132 may be associated with a respective application module 124. For instance, if application icon 132A represents a particular email application, prediction icon 134A represents the same email application. In some examples, prediction icons 134 may be larger than the respective corresponding application icons 132 but may otherwise be a similar shape and color as the respective corresponding application icons 132. However, in some examples, each prediction icon 134 is not necessarily the same shape or color as the respective corresponding application icon 132.

Icon management module 128 may determine a position within the interior of the graphical user interface at which to display each prediction icon 134. In some examples, icon management module 128 may determine the position for each prediction icon 134 based on a position of a respective corresponding application icon 132. For example, icon management module 128 may determine to output one or more prediction icons 134 proximate a corresponding application icon 132. In this way, if a user looks for a particular application icon 132 along the perimeter of the graphical user interface, the corresponding prediction icon 134 may be located near the corresponding application icon 132, which may make finding and selecting the corresponding prediction icon 134 easier for the user.

In some examples, icon management module 128 may determine a plurality of candidate positions for a particular prediction icon 134 and may determine a distance between each of the candidate positions for the particular prediction icon 134 and the corresponding application icon 132. For example, icon management module 128 may determine to position the particular prediction icon 134 at the position that results in the minimum distance to the corresponding application icon 132. For instance, if prediction module 126 determines that the user is most likely to select the applications associated with application icons 132A, 132D, 132E, and 132H (e.g., in that order), icon management module 128 may determine a position for prediction icon 134A that minimizes the distance to application icon 132A. Having determined a position that minimizes the distance between prediction icon 134A and application icon 132A, icon management module 128 may determine a position for prediction icon 134D that minimizes the distance between prediction icon 134D and application icon 132D, and so on.

In some examples, icon management module 128 may determine a position for each prediction icon 134 based on the minimum total distance between each prediction icons 134 and the position of each respective, corresponding application icon 132. Icon management module 128 may position each prediction icon 134 in such a way as to minimize the total distance between each prediction icons 134 and the respective corresponding application icons 132. For example, icon management module 128 may perform a multivariate minimization of the respective distances between the prediction icons 134 and their respective application icons 132. In some instances, icon management module 128 may perform a minimization based on Fitts' law.

In some examples, icon management module may be configured to output prediction icons 134 of a predefined size and at a predefined position within the interior of the graphical user interface. In other words, though the prediction icons 134 displayed at the graphical user interface may change based on the predictions by prediction module 126, the size and position of the displayed prediction icons 134 may be predefined. However, in other examples, icon management module may determine the size and/or position of the displayed prediction icons such that the size and/or position of prediction icons 134 may be variable. For instance, if prediction module 126 determines that a particular application is highly likely to be selected by a user, icon management module 128 may determine that the prediction icon 134 associated with the particular application should be larger than other prediction icons 134 and/or should be positioned closer to the corresponding application icon 132.

Responsive to icon management module 128 determining the size and/or position of prediction icons 134, UI module 114 may cause computing device 110 to output a graphical user interface at presence-sensitive display 112, where the graphical user interface includes application icons 132 arranged around the perimeter of the graphical user interface and prediction icons 134 arranged in the interior of the graphical user interface as determined by icon management module 128.

In some examples, presence-sensitive display 112 may receive a user input at a particular location of the graphical user interface. In some examples, the user input may cause computing device 110 to select one of the prediction icons 134 or one of the application icons 132. Responsive to receiving an indication of the user input to select a particular prediction icon 134 (e.g., prediction icon 134A) of the set of prediction icons 134, UI module 114 may cause computing device 110 to execute an action associated with a particular application corresponding to prediction icon 134A. For example, UI module 114 may cause computing device 110 to launch a particular application corresponding to prediction icon 134A and may cause presence-sensitive display 112 to output an updated graphical user interface associated with the particular application. Likewise, responsive to receiving an indication of the user input to select a particular application icon 132 (e.g., application icon 132C) of the set of application icons 132, UI module 114 may cause computing device 110 to execute an action associated with a particular application corresponding to application icon 132C. For example, UI module 114 may cause computing device 110 to launch a particular application corresponding to application icon 132C and may cause presence-sensitive display 112 to output an updated graphical user interface associated with the particular application.

Techniques of this disclosure may enable a computing device to predict applications that are likely to be selected by a user and determine where to display icons associated with the predicted applications. By outputting prediction icons in the center of the graphical user interface and application icons in a predefined position around the perimeter of the graphical user interface (e.g., near the bezel), techniques of the disclosure enable a computing device to output prediction icons at a location that the user is more likely to see them. By reducing the amount of time spent on target acquisition, i.e., the time a user spends visually searching for an icon, a computing device may enable a user to select a prediction icon without scrolling through a large set of icons, which may improve the user experience. By making it easier to find and select a desired icon, the described techniques may improve the performance and energy efficiency of the computing device by reducing the computations required to undo an action when an icon is chosen incorrectly or reducing the amount of time a screen is on while the user searches for an icon.

Although techniques of the disclosure have been described with respect to outputting application icons 132 and prediction icons 134, each of which represent respective applications 124, the icons may represent other content. For instance, the icons positioned around at least a portion of the perimeter of the graphical user interface may correspond to a set of contacts, a set of internet bookmarks, a set of songs, or any other set of content elements that may be stored by computing device 110, ISS 117, or remote device 118. Prediction icons 134 may represent a subset of elements in the set of elements. For example, if the icons positioned around the perimeter of the graphical user interface represent a set of contacts, prediction icons 134 may represent a subset of the contacts, where the subset includes the contacts predicted by prediction module 126 to be selected by a user. Likewise, if the icons positioned around the perimeter of the graphical user interface represent a set of internet bookmarks, prediction icons 134 may represent a subset of the bookmarks, where the subset of bookmarks includes the bookmarks predicted by prediction module 126 to be selected by a user.

Figure 2:
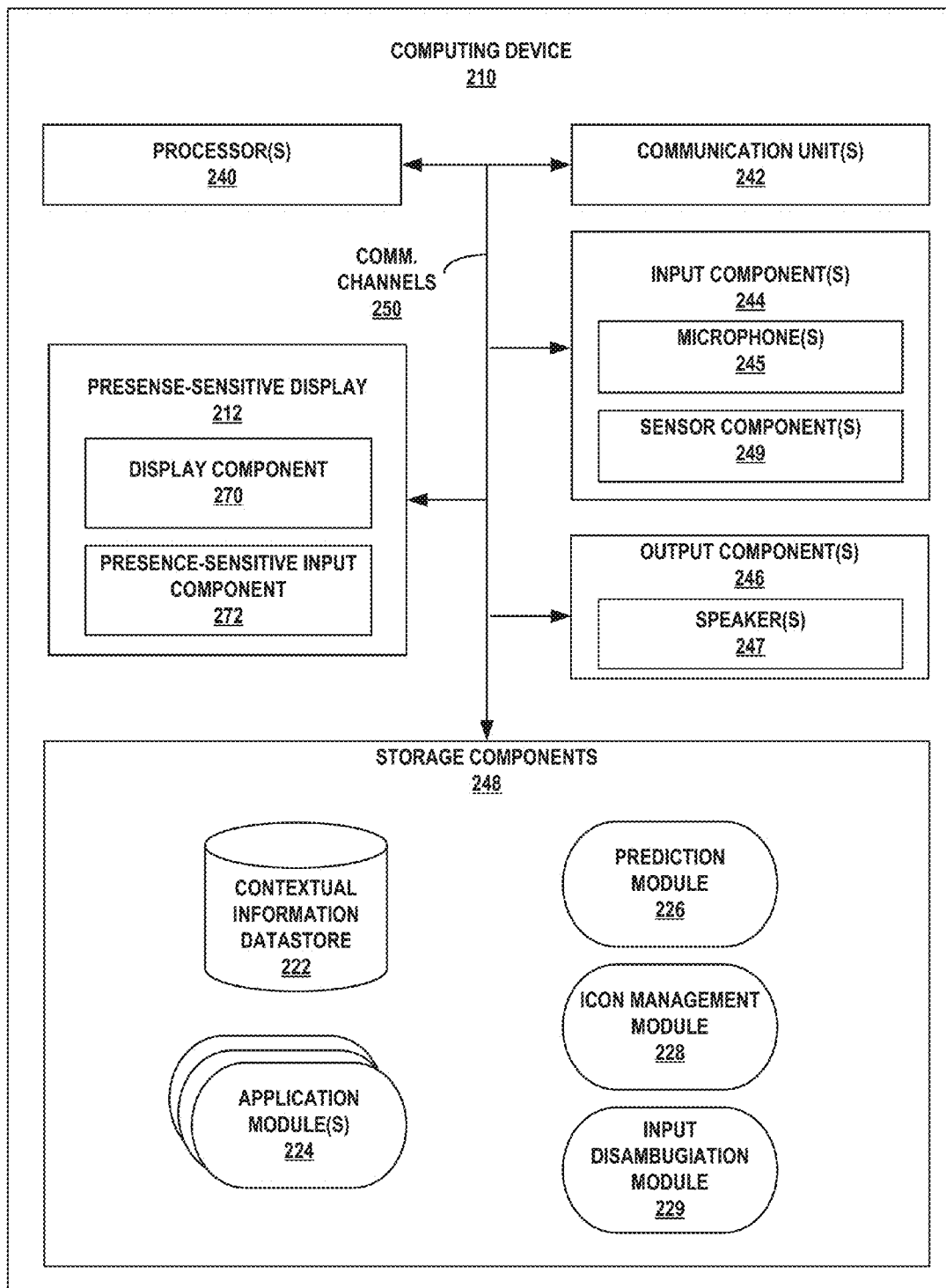
FIG. 2 is a conceptual diagram illustrating further details of a computing device for outputting prediction icons at a graphical user interface, in accordance with one or more aspects of the present disclosure.

FIG. 2 is a conceptual diagram illustrating further details of a computing device for outputting prediction icons at a graphical user interface, in accordance with one or more aspects of the present disclosure. Computing device 210 of FIG. 2 is described below as an example of computing device 110 illustrated in FIG. 1. FIG. 2 illustrates only one particular example of computing device 210, and many other examples of computing device 210 may be used in other instances and may include a subset of the components included in example computing device 210 or may include additional components not shown in FIG. 2.

As shown in the example of FIG. 2, computing device 210 includes presence-sensitive display 212, one or more processors 240, one or more communication units 242, one or more input components 244, one or more output components 246, and one or more storage components 248. Presence-sensitive display 212 includes display component 270 and presence-sensitive input component 272. Input components 244 may include one or more microphones 245 and one or more sensor components 249. Output components 246 may include one or more speakers 247. Storage components 248 of computing device 210 may include contextual information data store 222, one or more application modules 224, prediction module 226, icon management module 228, and input disambiguation module 229.

Communication channels 250 may interconnect each of the components 212, 240, 242, 244, 246, 248, 222, 224, 226, 228, and 229 for inter-component communications (physically, communicatively, and/or operatively). In some examples, communication channels 250 may include a system bus, a network connection, an inter-process communication data structure, or any other method for communicating data.

One or more communication units 242 of computing device 210 may communicate with external devices via one or more wired and/or wireless networks by transmitting and/or receiving network signals on the one or more networks. Examples of communication units 242 include a network interface card (e.g. such as an Ethernet card), an optical transceiver, a radio frequency transceiver, a GPS receiver, or any other type of device that can send and/or receive information. Other examples of communication units 242 may include short wave radios, cellular data radios, wireless network radios, as well as universal serial bus (USB) controllers.

One or more input components 244 of computing device 210 may receive input. Examples of input are tactile, audio, and video input. Input components 244 of computing device 210, in one example, includes a presence-sensitive display, touch-sensitive screen, mouse, keyboard, voice responsive system, video camera, microphone 245, or any other type of device for detecting input from a human or machine.

One or more input components 242 may include one or more sensor components 249. Numerous examples of sensor components 249 exist and include any input component configured to obtain environmental information about the circumstances surrounding computing device 210 and/or physiological information that defines the activity state and/or physical well-being of a user of computing device 210. In some examples, a sensor component may be an input component that obtains physical position, movement, and/or location information of computing device 210. For instance, sensor components 249 may include one or more location sensors (GPS components, Wi-Fi components, cellular components), one or more temperature sensors, one or more movement sensors (e.g., accelerometers, gyros), one or more pressure sensors (e.g., barometer), one or more ambient light sensors, and one or more other sensors (e.g., microphone, camera, infrared proximity sensor, hygrometer, and the like). Other sensors may include a heart rate sensor, magnetometer, glucose sensor, hygrometer sensor, olfactory sensor, compass sensor, step counter sensor, to name a few other non-limiting examples.

One or more output components 246 of computing device 210 may generate output. Examples of output are tactile, audio, and video output. Output components 246 of computing device 210, in one example, includes a presence-sensitive display, sound card, video graphics adapter card, speaker 247, cathode ray tube (CRT) monitor, liquid crystal display (LCD), or any other type of device for generating output to a human or machine.

Presence-sensitive display 212 of computing device 200 includes display component 270 and presence-sensitive input component 272. Display component 270 may be a screen at which information is displayed by presence-sensitive display 212 and presence-sensitive input component 272 may detect an object at and/or near display component 270. As one example range, presence-sensitive input component 272 may detect an object, such as a finger or stylus that is within two inches or less of display component 270. Presence-sensitive input component 272 may determine a location (e.g., an (x,y) coordinate) of display component 270 at which the object was detected. In another example range, presence-sensitive input component 272 may detect an object six inches or less from display component 270 and other ranges are also possible. Presence-sensitive input component 272 may determine the location of display component 270 selected by a user's finger using capacitive, inductive, and/or optical recognition techniques.

In some examples, presence-sensitive input component 272 also provides output to a user using tactile, audio, or video stimuli as described with respect to display component 270. In the example of FIG. 2, presence-sensitive display 212 presents a user interface. While illustrated as an internal component of computing device 210, presence-sensitive display 212 may also represent and external component that shares a data path with computing device 210 for transmitting and/or receiving input and output. For instance, in one example, presence-sensitive display 212 represents a built-in component of computing device 210 located within and physically connected to the external packaging of computing device 210 (e.g., a screen on a mobile phone). In another example, presence-sensitive display 212 represents an external component of computing device 210 located outside and physically separated from the packaging of computing device 210 (e.g., a monitor, a projector, etc. that shares a wired and/or wireless data path with a tablet computer).

One or more processors 240 may implement functionality and/or execute instructions within computing device 210. For example, processors 240 on computing device 210 may receive and execute instructions stored by storage components 248 that execute the functionality of modules 224, 226, 228, and/or 229. The instructions executed by processors 240 may cause computing device 210 to store information within storage components 248 during program execution. Examples of processors 240 include application processors, display controllers, sensor hubs, and any other hardware configure to function as a processing unit. Processors 240 may execute instructions of modules 224, 226, 228, and/or 229 to cause presence-sensitive display 212 to render portions of content of display data as user interface 130 at presence-sensitive display 212. That is, modules 224, 226, 228, and/or 229 may be operable by processors 240 to perform various actions or functions of computing device 210.

One or more storage components 248 within computing device 210 may store information for processing during operation of computing device 210 (e.g., computing device 210 may store data accessed by modules 216, 218, 224, 226, and/or 228 during execution at computing device 210). In some examples, storage component 248 is a temporary memory, meaning that a primary purpose of storage component 248 is not long-term storage. Storage components 248 on computing device 220 may be configured for short-term storage of information as volatile memory and therefore not retain stored contents if powered off. Examples of volatile memories include random access memories (RAM), dynamic random access memories (DRAM), static random access memories (SRAM), and other forms of volatile memories known in the art.

Storage components 248, in some examples, also include one or more computer-readable storage media. Storage components 248 may be configured to store larger amounts of information than volatile memory. Storage components 248 may further be configured for long-term storage of information as non-volatile memory space and retain information after power on/off cycles. Examples of non-volatile memories include magnetic hard discs, optical discs, floppy discs, flash memories, or forms of electrically programmable memories (EPROM) or electrically erasable and programmable (EEPROM) memories. Storage components 248 may store program instructions and/or information (e.g., data) associated with modules 216, 218, 224, 226, and/or 228, as well as data stores 280.

Application modules 224 represent all the various individual applications and services executing at computing device 210. A user of computing device 210 may interact with an interface (e.g., a graphical user interface) associated with one or more application modules 224 to cause computing device 210 to perform a function. Numerous examples of application modules 224 may exist and include, a fitness application, a calendar application, a personal assistant or prediction engine, a search application, a map or navigation application, a transportation service application (e.g., a bus or train tracking application), a social media application, a game application, an e-mail application, a messaging application, an Internet browser application, or any and all other applications that may execute at computing device 210.

In some example, icon management module 228 may cause computing device 210 to output, via presence-sensitive display 212, a plurality of application icons 132 associated application modules 224. For example, each application module 224 may be represented by a visual icon that is displayed by presence-sensitive display 212. As described above with reference to FIG. 1, icon management module 228 may cause the plurality of application icons 132 to be displayed around at least a portion of the perimeter of the graphical user interface. In some examples, the position of each of the plurality of application icons 132 may be predefined. In this way, a user of computing device 210 may learn where each application icon 132 will be displayed which may reduce the amount of user effort spent trying to find a particular application icon 132. In some examples, by positioning application icons 132 in a predefined location, a user may build muscle memory that allows the user to select a particular application icon 132 with minimal mental effort. The predefined position of each application icon 132 may change if new applications 224 are installed or previously installed applications 224 are uninstalled. For example, if an application is uninstalled, application icons 132 for the remaining applications 224 may be repositioned to a new predefined position by spreading application icons 132 slightly further apart.

Prediction module 226 may identify a subset of applications, from the set of applications 224, that are likely to be selected by a user. For instance, prediction module 226 may identify the subset of applications by predicting which applications the user is likely to select. In some examples, prediction module 226 may predict which applications the user is likely to select based on history information, such as the most recently used or most frequently used applications. The number of predicted applications may be variable in some instances. In one example, prediction module 226 may predict four applications the user is likely to select based on the four most frequently used applications. In another example, prediction module 226 may predict three applications that the user is likely to select based on the three most recently used applications. The number of predicted applications is merely one example of predicted applications and the number of predicted applications may be more or less. In some instances, prediction module 226 may predict applications the user is likely to select based on the relatedness between applications. For instance, if the user most recently used a gaming application, prediction module 226 may predict that the user is likely to select another gaming application. Thus, in this instance, prediction module 226 may identify similar gaming applications, recently used gaming applications, or frequently used gaming applications.

Prediction module 226 may, in some examples, predict which applications the user is likely to select based on contextual information. In some examples, prediction module 226 may retrieve contextual information from contextual information data store 222. In some examples, where contextual information includes day of the week, prediction module 226 may predict that the user is likely to select a productivity application (e.g., email, calendar, etc.) during the work week but that the user is likely to select an entertainment application (e.g., social media, gaming, etc.) on the weekend. In other examples, where contextual information includes information derived from an application (e.g., email, SMS, calendar) and the information indicates the user is likely to attend a sporting event, prediction module 226 may predict that the user is likely to select a ticketing application, mobile payment application, traffic application, and/or any other application the user may use during the event or while traveling to the event. In some examples, contextual information may include sensor data received from one or more sensor components 249. For example, where contextual information includes information received from a sensor such as a heart rate sensor or movement sensor and the information indicates the user has a high heart rate or has experienced a threshold amount of movement, which may indicate the user is exercising, prediction module 226 may predict that the user is likely to select a fitness application, a food tracking application, a mapping application, and/or any other application the user may use while exercising or after exercising.

In some examples, prediction module 226 may determine a probability that the user will select a particular application. For example, the probability that the user is likely to select a particular application may be based on history information, relatedness of application, and/or contextual information, as described above. In some example, prediction module 226 may identify an application as an application the user is likely to select if the probability that the user will select a particular application is greater than a threshold probability. In some examples, the number of applications having a probability greater than the threshold probability may change. As a result, the number of applications predicted to be selected by the user may change. However, in some examples, prediction module 226 may predict a set number of applications. For example, prediction module 226 may determine the probability that a particular application will be selected and identify the three applications with the highest probability as the subset of applications most likely to be selected by the user.

Responsive to prediction module 226 predicting the applications to be selected by a user, icon management module 128 may cause presence-sensitive display 212 to output a one or more prediction icons 134 associated with the applications predicted by prediction module 226 to be selected by a user. In some examples, prediction icons 134 may be positioned in the interior of the graphical user interface. Each prediction icon 134 may correspond to a respective application icon 132. In other words, presence-sensitive display 212 may display an application icon 132 associated with each application installed at computing device 210 and may also display a prediction icon 134 associated with the one or more applications predicted to be selected by a user. In this way, presence-sensitive display 212 may display two icons representing the same application: an application icon 132 around the perimeter of the graphical user interface and a prediction icon 134 within an interior of the graphical user interface.

Icon management module 228 may determine a position for a particular prediction icon 134 (e.g., prediction icon 134E) based on a position of a respective corresponding application icon 132 (e.g., application icon 132E). For instance, prediction icon 134E may be positioned proximate the corresponding application icon 132E. In some examples, prediction icon 134E may be proximate to corresponding application icon 132E when the distance between prediction icon 134E and corresponding application icon 132E is less than a threshold distance. For example, the threshold distance may be based on display units, such as a predetermined number of display units or a percentage of display units. As used throughout this disclosure, display units may refer to pixels, scale-independent pixels, density-independent pixels, etc. In some examples, the threshold distance may be a predetermined percentage of the total number of pixels displayed by presence-sensitive display 212, a predetermined percentage of the number of pixels in width or length, etc. For example, prediction icon 134E may be proximal to application icon 132E if the distance between prediction icon 134E and corresponding application icon 132E is less than 200 pixels. As another example, prediction icon 134E may be proximal to corresponding application icon 132E if the distance between prediction icon 134E and corresponding application icon 132E is less than 20% of the number of pixels in the lengthwise direction.

In some examples, the distance between a candidate position for prediction icon 134E and the position of corresponding application icon 132E is measured from the center of prediction icon 134E and the center of corresponding application icon 132E. However, in some examples, the distance between a candidate position for prediction icon 134E and the position of corresponding application icon 132E is measured from a boundary of prediction icon 134E and a boundary of corresponding application icon 132E. In yet another example, each prediction icon 134 and/or application icon 132 may include a buffer region (e.g., a predetermined number of pixels from the boundary of the icon or a predetermined number of pixels from the center of an icon) in order to allow a user to select the icon when the input does not fall within the display region of the icon. In such an example, the distance may be measured from the boundary of the buffer region for prediction icon 134E and the boundary of the buffer region for corresponding application icon 132E.

In some examples, prediction icon 134E may be proximate to corresponding application icon 132E if at least a portion of prediction icon 134E is displayed in the same quadrant as corresponding application icon 132E. For instance, consider again an example where the graphical user interface is circular such that a position of the graphical user interface may be described with reference to an hour on analog clock face. In this instance, Quadrant I may be defined as the region between the center of the display, the 12 o'clock position, and the 3 o'clock position; Quadrant II may be defined as the region between the center of the display, the 12 o'clock position, and the 9 o'clock position, Quadrant III may be defined as the region between the center of the display, the 6 o'clock position, and the 9 o'clock position, and Quadrant IV may be defined as the region between the center of the display, the 6 o'clock position, and the 3 o'clock position. In this instance, if application icon 132E is displayed at the 6 o'clock position, corresponding prediction icon 134E may be proximal to application icon 132E if the center of corresponding prediction icon 134E is displayed in either Quadrant III or Quadrant IV.

Icon management module 228 may determine a position for prediction icon 134E based on a minimum distance between a candidate position of prediction icon 134E and corresponding application icon 132E. For example, icon management module 228 may determine a plurality of candidate positions for prediction icon 134E and may determine the distance from each of the candidate positions for prediction icon 134E to the predefined position of corresponding application icon 132E. For instance, icon management module 228 may determine a first distance between a first candidate position for prediction icon 134E and the position of corresponding application icon 132E, a second distance between a second candidate position for prediction icon 134E and the position of corresponding application icon 132E, and so on. In some examples, icon management module 228 may determine a position for a prediction icon 134 associated with an application 224 having the highest probability of being selected by a user (e.g., prediction icon 134E) by minimizing the distance between the prediction icon 134E and corresponding application icon 132E. After determining the position of the prediction icon 134E associated with the application 224 having the highest probability of being selected by the user, icon management module 228 may determine the position of a prediction icon 134 associated with the application 224 having the next highest probability of being selected by the user.

In some examples, rather than minimizing the distance between a particular prediction icon 134 and the corresponding application icon 132, icon management module 228 may minimize the total distance between each prediction icon 134 and the respective, corresponding application icon 132. For example, icon management module 228 may determine the combination of candidate positions for each prediction icon 134. For instance, if prediction module 226 determines four prediction icons and the set of candidate positions includes four candidate positions, icon management module 228 may determine there are 24 (i.e., four factorial) possible combinations of candidate positions for the four prediction icons 134. For each of the 24 possible combinations, icon management module 228 may sum the distance between a respective candidate position for each prediction icon 134 and the position for each respective, corresponding application icon 132 and may choose the combination with the smallest total distance. Thus, icon management module 128 may position each prediction icon 134 in such a way as to minimize the total distance between each prediction icons 134 and the respective corresponding application icons 132. In some examples, icon management module 228 may weight the distance between a candidate position for a particular prediction icon 134 and the respective, corresponding application icon 132 by the probability of the particular prediction icon 134 being selected. In other words, the distance may be multiplied by the probability of the particular prediction icon 134 being selected. In this way, icon management module 228 may minimized the sum of the weighted candidate distances. In some examples, icon management module 128 may perform a minimization based on Fitts' law, as will be described more with reference to FIG. 4.

Presence-sensitive display 212 may display application icons 132 around at least a portion of the perimeter of the graphical user interface at the predetermined positions. Similarly, presence-sensitive display 212 may display prediction icons 134 within the interior of the graphical user interface at the respective positions determined by icon management module 228, where the interior of the graphical user interface is bounded by the perimeter of the graphical user interface.

Responsive to display component 270 of presence-sensitive display 212 displaying a graphical user interface including application icons 132 and prediction icons 134, presence-sensitive input component 272 may receive a user input. In response to receiving an indication of the user input (e.g., x-y coordinates of the user input), input disambiguation module 229 may determine whether to select a prediction icon 134 or magnify a region of the graphical user interface proximate the display location of the user input. For example, input disambiguation module 229 may determine whether to select a particular prediction icon 134 (e.g., prediction icon 134E) or magnify the graphical user interface based on the location of the user input.

For example, input disambiguation module 229 may determine whether to select a prediction icon 134E or magnify the graphical user interface by determining a first distance between the location of the user input and prediction icon 134E and a second distance between the location of the user input and a particular application icon 132 (e.g., an application icon 132 closest to the location of the user input, such as application icon 132H). Input disambiguation module 229 may compare the first distance and the second distance and determine which distance is smallest. If the first distance is less than the second distance, meaning that the user input was closer to particular prediction icon 134E than application icon 132H, input disambiguation module 229 may determine to select prediction icon 134E. Responsive to selecting prediction icon 134E, processor 240 may execute an action associated with prediction icon 134E. For example, processor 240 may start the application 224 corresponding to prediction icon 134E and may cause presence-sensitive display 212 to output a new graphical user interface associated with the application 224. However, if the second distance is less than the first distance, meaning that the user input was closer to the application icon 132H than prediction icon 134E, input disambiguation module 229 may determine to magnify a region of the graphical user interface proximate the location of the user input. In some examples, magnifying a region of the graphical user interface may include increasing the size of the content displayed in a particular region of the graphical user interface. For example, processor 240 may cause presence-sensitive display 212 to output a new graphical user interface that includes enlarged versions of application icon 132H and the adjacent application icons 132 (e.g., application icons 132G, 132I). In this way, the user may cause computing device 210 to zoom in on application icons 132G-I so that the user may more easily select one of application icons 132G-I.

As another example, input disambiguation module 229 may determine whether to select prediction icon 134E or magnify the graphical user interface by determining a first proportion of a region of the user input that overlaps prediction icon 134E and a second proportion of a region of the user input that overlaps application icon 132H. Input disambiguation module 229 may compare the first proportion and the second proportion and determine which proportion is largest. If the first proportion is greater than the second proportion, meaning that the user input overlapped with more of prediction icon 134E than application icon 132G, input disambiguation module 229 may determine to select prediction icon 134E. Responsive to selecting prediction icon 134E, processor 240 may execute an action associated with prediction icon 134E. However, if the second proportion is greater than the first proportion, meaning that the user input overlapped with more application icon 132H than prediction icon 134E, input disambiguation module 229 may determine to magnify a region of the graphical user interface proximate the location of the user input. For example, processor 240 may cause presence-sensitive display 212 to output a new graphical user interface that includes enlarged versions of application icon 132H and adjacent application icons 132G, 132I.

Presence-sensitive display 212 may receive a second user input in response to displaying a magnified version of the graphical user interface. For example, a user may touch a portion of presence-sensitive display corresponding to one of the enlarged application icons 132G-I (e.g., application icon 123G). UI module 114 may receive an indication of the second user input from presence-sensitive display 212 and may cause processor 240 to execute an action associated with application icon 132G. For instance, processor 240 may cause presence-sensitive display 212 to output for display a menu of actions associated with application icon 132G.

Figure 3:
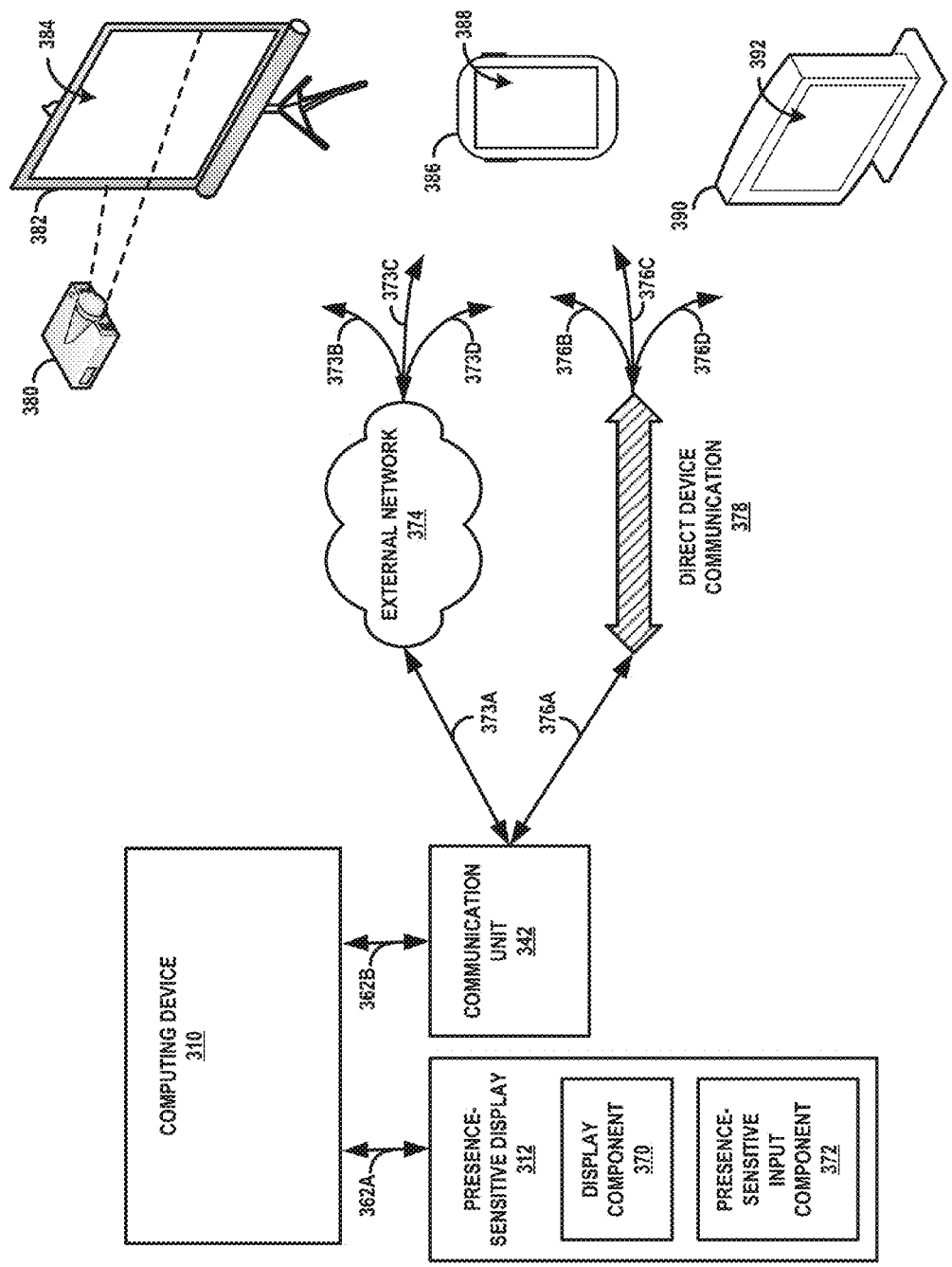
FIG. 3 is a block diagram illustrating an example computing device for outputting prediction icons for display at a remote device, in accordance with one or more techniques of the present disclosure.

FIG. 3 is a block diagram illustrating an example computing device that outputs graphical content for display at a remote device, in accordance with one or more techniques of the present disclosure. Graphical content, generally, may include any visual information that may be output for display, such as text, images, a group of moving images, to name only a few examples. The example shown in FIG. 3 includes a computing device 310, a presence-sensitive display 312, communication unit 342, projector 380, projector screen 382, mobile device 386, and visual display component 390. In some examples, presence-sensitive display 302 may be a presence-sensitive display as described in FIGS. 1-2. Although shown for purposes of example in FIGS. 1 and 2 as a stand-alone computing device 110, a computing device such as computing device 310 may, generally, be any component or system that includes a processor or other suitable computing environment for executing software instructions and, for example, need not include a presence-sensitive display.

As shown in the example of FIG. 3, computing device 310 may be a processor that includes functionality as described with respect to processors 240 in FIG. 2. In such examples, computing device 310 may be operatively coupled to presence-sensitive display 312 by a communication channel 362A, which may be a system bus or other suitable connection. Computing device 310 may also be operatively coupled to communication unit 342, further described below, by a communication channel 362B, which may also be a system bus or other suitable connection. Although shown separately as an example in FIG. 3, computing device 310 may be operatively coupled to presence-sensitive display 312 and communication unit 342 by any number of one or more communication channels.

In other examples, such as illustrated previously by computing device 110 in FIGS. 1-2, a computing device may refer to a portable or mobile device such as mobile phones (including smart phones), laptop computers, etc. In some examples, a computing device may be a desktop computer, tablet computer, smart television platform, camera, personal digital assistant (PDA), server, or mainframes.

Presence-sensitive display 312 may include display component 370 and presence-sensitive input component 372. Display component 370 may, for example, receive data from computing device 310 and display the graphical content. In some examples, presence-sensitive input component 372 may determine one or more user inputs (e.g., continuous gestures, multi-touch gestures, single-touch gestures) at presence-sensitive display 312 using capacitive, inductive, and/or optical recognition techniques and send indications of such user input to computing device 310 using communication channel 362A. In some examples, presence-sensitive input component 372 may be physically positioned on top of display component 370 such that, when a user positions an input unit over a graphical element displayed by display component 370, the location at which presence-sensitive input component 372 corresponds to the location of display component 370 at which the graphical element is displayed.

As shown in FIG. 3, computing device 310 may also include and/or be operatively coupled with communication unit 342. Communication unit 342 may include functionality of communication unit 242 as described in FIG. 2. Examples of communication unit 342 may include a network interface card, an Ethernet card, an optical transceiver, a radio frequency transceiver, or any other type of device that can send and receive information. Other examples of such communication units may include Bluetooth, 3G, and WiFi radios, Universal Serial Bus (USB) interfaces, etc. Computing device 310 may also include and/or be operatively coupled with one or more other devices (e.g., input devices, output components, memory, storage devices) that are not shown in FIG. 3 for purposes of brevity and illustration.

FIG. 3 also illustrates a projector 380 and projector screen 382. Other such examples of projection devices may include electronic whiteboards, holographic display components, and any other suitable devices for displaying graphical content. Projector 380 and projector screen 382 may include one or more communication units that enable the respective devices to communicate with computing device 310. In some examples, the one or more communication units may enable communication between projector 380 and projector screen 382. Projector 380 may receive data from computing device 310 that includes graphical content. Projector 380, in response to receiving the data, may project the graphical content onto projector screen 382. In some examples, projector 380 may determine one or more user inputs (e.g., continuous gestures, multi-touch gestures, single-touch gestures) at projector screen using optical recognition or other suitable techniques and send indications of such user input using one or more communication units to computing device 310. In such examples, projector screen 382 may be unnecessary, and projector 380 may project graphical content on any suitable medium and detect one or more user inputs using optical recognition or other such suitable techniques.

Projector screen 382, in some examples, may include a presence-sensitive display 384. Presence-sensitive display 384 may include a subset of functionality or all of the functionality of presence-sensitive display 112 and/or 312 as described in this disclosure. In some examples, presence-sensitive display 384 may include additional functionality. Projector screen 382 (e.g., an electronic whiteboard), may receive data from computing device 310 and display the graphical content. In some examples, presence-sensitive display 384 may determine one or more user inputs (e.g., continuous gestures, multi-touch gestures, single-touch gestures) at projector screen 382 using capacitive, inductive, and/or optical recognition techniques and send indications of such user input using one or more communication units to computing device 310.

FIG. 3 also illustrates mobile device 386 and visual display component 390. Mobile device 386 and visual display component 390 may each include computing and connectivity capabilities. Examples of mobile device 386 may include e-reader devices, convertible notebook devices, hybrid slate devices, etc. Examples of visual display component 390 may include other semi-stationary devices such as televisions, computer monitors, etc. As shown in FIG. 3, mobile device 386 may include a presence-sensitive display 388. Visual display component 390 may include a presence-sensitive display 392. Presence-sensitive displays 388, 392 may include a subset of functionality or all of the functionality of presence-sensitive display 112 and/or 312 as described in this disclosure. In some examples, presence-sensitive displays 388, 392 may include additional functionality. In any case, presence-sensitive display 392, for example, may receive data from computing device 310 and display the graphical content. In some examples, presence-sensitive display 392 may determine one or more user inputs (e.g., continuous gestures, multi-touch gestures, single-touch gestures) at projector screen using capacitive, inductive, and/or optical recognition techniques and send indications of such user input using one or more communication units to computing device 310.

As described above, in some examples, computing device 310 may output graphical content for display at presence-sensitive display 312 that is coupled to computing device 310 by a system bus or other suitable communication channel. Computing device 310 may also output graphical content for display at one or more remote devices, such as projector 380, projector screen 382, mobile device 386, and visual display component 390. For instance, computing device 310 may execute one or more instructions to generate and/or modify graphical content in accordance with techniques of the present disclosure. Computing device 310 may output the data that includes the graphical content to a communication unit of computing device 310, such as communication unit 342. Communication unit 342 may send the data to one or more of the remote devices, such as projector 380, projector screen 382, mobile device 386, and/or visual display component 390. In this way, computing device 310 may output the graphical content for display at one or more of the remote devices. In some examples, one or more of the remote devices may output the graphical content at a presence-sensitive display that is included in and/or operatively coupled to the respective remote devices.

In some examples, computing device 310 may not output graphical content at presence-sensitive display 312 that is operatively coupled to computing device 310. In other examples, computing device 310 may output graphical content for display at both a presence-sensitive display 312 that is coupled to computing device 310 by communication channel 362A, and at one or more remote devices. In such examples, the graphical content may be displayed substantially contemporaneously at each respective device. For instance, some delay may be introduced by the communication latency to send the data that includes the graphical content to the remote device. In some examples, graphical content generated by computing device 310 and output for display at presence-sensitive display 312 may be different than graphical content display output for display at one or more remote devices.

Computing device 310 may send and receive data using any suitable communication techniques. For example, computing device 310 may be operatively coupled to external network 374 using network link 373A. Each of the remote devices illustrated in FIG. 3 may be operatively coupled to network external network 374 by one of respective network links 373B, 373C, or 373D. External network 374 may include network hubs, network switches, network routers, etc., that are operatively inter-coupled thereby providing for the exchange of information between computing device 310 and the remote devices illustrated in FIG. 3. In some examples, network links 373A-373D may be Ethernet, ATM or other network connections. Such connections may be wireless and/or wired connections.

In some examples, computing device 310 may be operatively coupled to one or more of the remote devices included in FIG. 3 using direct device communication 378. Direct device communication 378 may include communications through which computing device 310 sends and receives data directly with a remote device, using wired or wireless communication. That is, in some examples of direct device communication 378, data sent by computing device 310 may not be forwarded by one or more additional devices before being received at the remote device, and vice-versa. Examples of direct device communication 378 may include Bluetooth, Near-Field Communication, Universal Serial Bus, WiFi, infrared, etc. One or more of the remote devices illustrated in FIG. 3 may be operatively coupled with computing device 310 by communication links 376A-376D. In some examples, communication links 376A-376D may be connections using Bluetooth, Near-Field Communication, Universal Serial Bus, infrared, etc. Such connections may be wireless and/or wired connections.

In accordance with techniques of the disclosure, computing device 310 may determine a position at which to display a prediction icon 134 based on a predefined position of respective corresponding application icon 132. Computing device 310 may send data, via communication unit 342 and external network 374, that causes presence-sensitive display 392 to output, for display, a set of application icons 132, where each application icon 132 corresponds to a respective application from a set of applications and is displayed at a respective predefined position. Likewise, computing device 310 may send data, via communication unit 342 and external network 374, that causes presence-sensitive display 392 to output, for display, the prediction icon 134 at the determined position.

FIGS. 4A-4D are conceptual diagrams illustrating example graphical user interfaces with various configurations of prediction icons, in accordance with one or more aspects of the present disclosure. FIGS. 4A-4D illustrate example graphical user interfaces however, many other examples of graphical user interfaces may be used in other instances. Each graphical interface may correspond to a graphical user interface output by computing devices 110, 210 of FIGS. 1 and 2 respectively. As illustrated in the examples of FIGS. 4A-4D, each example graphical user interface includes nine application icons 432A-I (collectively, application icons 432) positioned around at least a portion of the perimeter of graphical user interface. Likewise, each example graphical user interface illustrated in the examples of FIGS. 4A-4D includes four prediction icons 434A, 434D, 434E, and 434H (collectively, prediction icons 434) positioned within the interior of the graphical user interface, where the interior is bounded by the perimeter. However, in other examples, a graphical user interface may include more or fewer application icons 432 and/or prediction icons 434.

In some examples, icon management module 128 may determine a position for each prediction icon 434 based on the position of a respective, corresponding application icon 432. For example, icon management module 128 may determine a position for each prediction icon 434 by minimizing the sum of the distances between each prediction icon 434 and the respective, corresponding application icon 432. In some examples, icon management module 128 may weight the distance between each prediction icon 434 and the corresponding application icon 432 by the probability of the prediction icon 434 being selected.

Figure 4B:
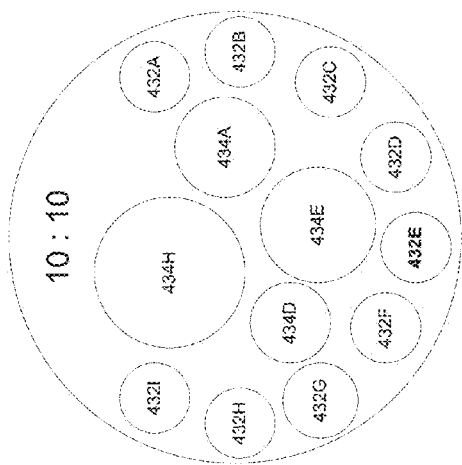
FIG. 4A-4D are conceptual diagrams illustrating example layouts of prediction icons of graphical user interfaces output by a computing device, in accordance with one or more aspects of the present disclosure.
Figure 4D:
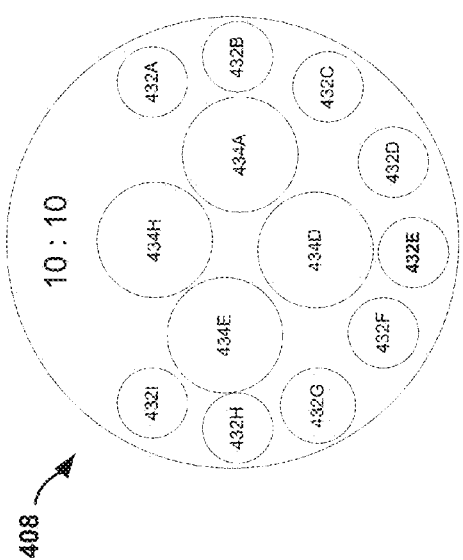
Figure 4A:
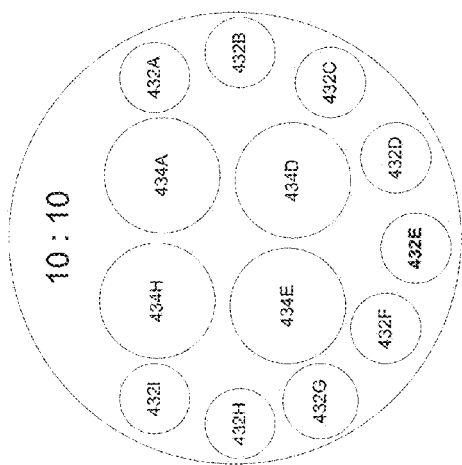

FIG. 4A is a conceptual diagram illustrating an example graphical user interface 402 including a plurality of prediction icons 434 having uniform and predetermined sizes. In the example of FIG. 4A, graphical user interface 402 includes a set of candidate positions having the same number of candidate positions as there are prediction icons 434. In other words, because there are four prediction icons 434 and the set of candidate positions includes four candidate positions, each prediction icon will occupy one of the four candidate positions. Icon management module 128 may determine all of the possible combinations of prediction icons and candidate positions, which in this is example is 24 (i.e., four factorial) possible combinations of prediction icons 434 and candidate positions. In some examples, for each possible combination, icon management module 128 may determine the total distance between each prediction icon 434 and the respective, corresponding application icon 432, according to the following equation:

$$D = \sum_{i=1}^{n} Pr_i * \text{distance}(B_i, C_i) - R_i - r \quad \text{Equation 1:}$$

As shown in Equation 1, D represents to the total distance. The subscript "i" represents a particular prediction icon 434, and "n" represents the number of prediction icons 434 to be displayed. $Pr_i$ represents the probability of a particular prediction icon 434 being selected by a user. Icon management module 128 may receive the value of $Pr_i$ from prediction module 126. The distance function "distance($B_i$, $C_i$)" may represent the Euclidian distance for a circular or elliptical display device or the Manhatttan distance for a rectangular display device. $C_i$ represents the location of the particular prediction icon 434 and $B_i$ represents the location of the corresponding application icon 432. "R" represents the size (e.g., the radius) of each prediction icon 434 and "r" represents the size (e.g., the radius) of each application icon 432. Responsive to determining the total distance D for every possible combination of prediction icons and candidate positions, icon management module 128 may determine to arrange the prediction icons 434 according to the combination that results in the smallest total distance.

FIG. 4B is a conceptual diagram illustrating an example graphical user interface 404 including a plurality of prediction icons 434 having various, non-predetermined sizes. In the example of FIG. 4B, the number of candidate positions in the set of candidate positions exceeds the number of prediction icons 434. For example, graphical user interface 404 may include a grid of candidate positions. Each point on the grid may serve as a candidate position and may be separated from the adjacent candidate locations by a predetermined number of pixels (e.g., 5 pixels, 20 pixels, or any other number of pixels). Because the number of candidate positions in the set of candidate positions exceeds the number of prediction icons 434 and the size of each prediction icon 434 may be different, icon management module 128 may determine a position for each prediction icon 434 according to the cost following function.

$$\text{Cost} = \sum_{i=1}^{n} PR_i * (T_i + \alpha D_i) \quad \text{Equation 2}$$

$$T_i = a + b\log_2\left(1 + \frac{A}{2R_i}\right) \quad \text{Equation 3}$$

$$D_i = \text{distance}(B_i, C_i) - R_i - r \quad \text{Equation 4}$$

As described with reference to FIG. 4A, the subscript "i" represents a particular prediction icon 434 and "n" represents the number of prediction icons 434 to be displayed. $Pr_i$ represents the probability of a particular prediction icon 434 being selected by a user, which may be received from prediction module 126.

Equation 3 includes a time function, where $T_1$ represents the time to find a particular prediction icon 434, also known as the time to acquire the target icon, as modeled by Fitts' law. Within the time function, "a" and "b" are constants. According to an empirical study using the techniques described herein, in some examples, a may be set equal to 132.5 and b may be set equal to 113.8. In addition, "A" represents the distance from a starting point of a user input device (e.g., a finger) to a particular prediction icon 434. Because the user input device may start anywhere, A may be any constant value. Equation 2 also includes a constant α and a distance function $D_i$. The constant α may be used to control the weight of the distance function $D_i$, which represents the distance between a particular prediction icon 434 and the corresponding application icon 432, as described above with reference to FIG. 4A.

Icon management module 128 may determine a size and position for each prediction icon 434 that minimizes the cost function of Equation 2 using a simulated annealing algorithm. Responsive to determining the size and positions of prediction icons 434, icon management module 128 may cause presence-sensitive display 112 to output the prediction icons at the determined positions.

Figure 4C:
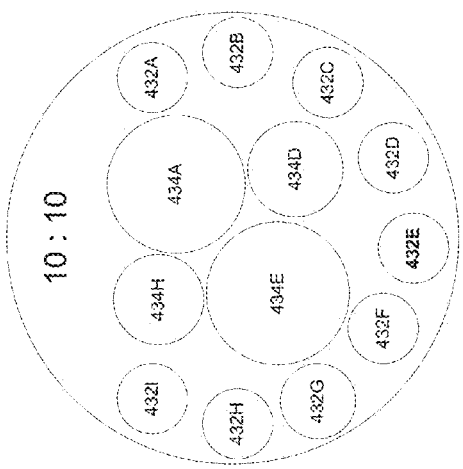

FIG. 4C is a conceptual diagram illustrating an example graphical user interface 406 including a plurality of prediction icons 434 having various, non-predetermined sizes. Similar to the example of FIG. 4A, graphical user interface 406 includes the same number of candidate positions as there are prediction icons 434. In other words, each of the four prediction icons 434 will occupy one of the four candidate positions. Icon management module 128 may determine a size and position of each prediction icon 434 that minimizes a cost function similar to Equation 2.

FIG. 4D is a conceptual diagram illustrating an example graphical user interface 402 including a plurality of prediction icons 434 having uniform and predetermined sizes. Similar to the example of FIG. 4B, the number of candidate positions may exceed the number of prediction icons 434. As a result, icon management module 128 may determine the position of each prediction icon 434 that minimizes a cost function similar to Equation 2.

Figure 5:
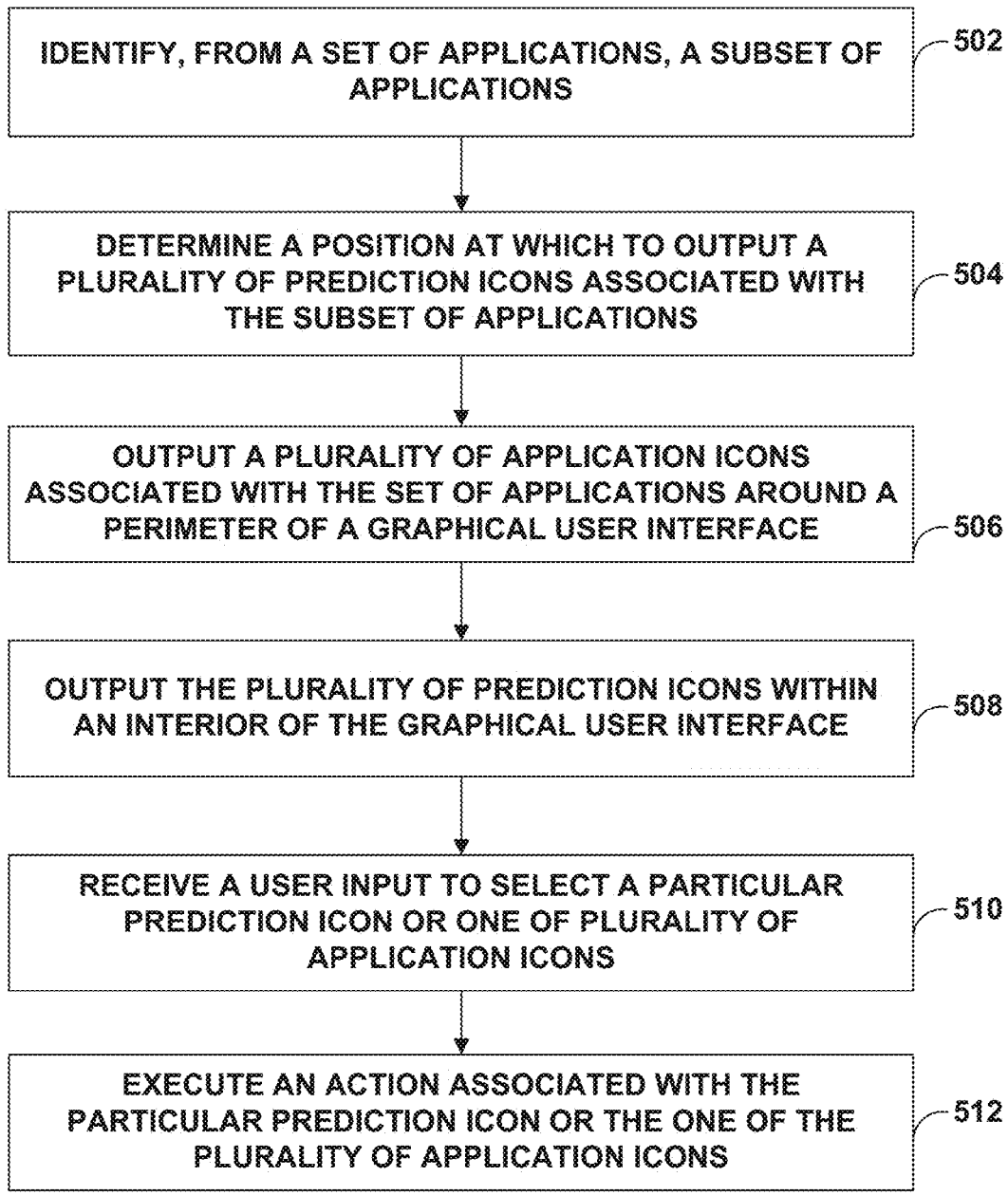
FIG. 5 is a flow diagram illustrating example operations of a computing device for outputting prediction icons, in accordance with one or more aspects of the present disclosure.

FIG. 5 is a flow diagram illustrating example operations of a computing device for outputting prediction icons, in accordance with one or more aspects of the present disclosure. The process of FIG. 5 may be performed by one or more processors of a computing device, such as computing device 110 of FIG. 1 and/or computing device 210 of FIG. 2. The steps of the process of FIG. 5 may in some examples, be repeated, omitted, and/or performed in any order. For purposes of illustration only, the process of FIG. 5 is below within the context of computing device 110 of FIG. 1.

Prediction module 126 may identify, from a set of applications, a subset of applications (502). For example, prediction module 126 may identify the subset of applications by predicting applications likely to be selected by a user of computing device 110. Prediction module 126 may predict the applications likely to be selected by a user based on history information (e.g., most frequently selected applications or most recently selected applications), degree of relatedness between applications, and/or contextual information (e.g., day, time, location, sensor data, etc.).

Icon management module 128 may determine a position at which to output a plurality of prediction icons 134 associated with the subset of applications (504). The position of prediction icons 134 may be based on a position of respective, corresponding application icons 132. For example, icon management module 128 may determine to position each prediction icon 134 proximate a corresponding application icon 132. In some examples, icon management module 128 may determine the position for each prediction icon 134 based on minimizing the distance between a particular prediction icon 134 and a corresponding particular application icon 132. In some examples, icon management module 128 may determine the position for each prediction icon 134 based on minimizing the total distance between each prediction icon 134 and the respective corresponding application icons 132.

Presence-sensitive display 112 may output a plurality of application icons 132 associated with the set of applications around at least a portion of the perimeter of a graphical user interface (506). In some instances, presence-sensitive display 112 may output application icons 132 around the entire perimeter of the graphical user interface. In other instances, presence-sensitive display 112 may output application icons 132 around a portion of the perimeter of the graphical user interface. Presence-sensitive display 112 may output the plurality of prediction icons 134 within an interior of the graphical user interface (508). Presence-sensitive display 112 may output prediction icons 134 at the positions determined by icon management module 128.

Presence-sensitive display 112 may receive a user input to select a particular prediction icon 134 or one of the plurality of application icons 132 (510). UI module 114 may receive an indication of the user input and may cause computing device 110 to execute an action associated with the particular prediction icon 134 or one of the plurality of application icons 132 (512). For example, UI module 114 may cause computing device 110 to launch an application associated with the particular prediction icon 134. In another example, UI module 114 may cause computing device 110 to launch an application associated with the selected one of the plurality of application icons 132. In another instance, UI module 114 may cause presence-sensitive display to output a new graphical user interface associated with an application corresponding to the selected prediction icon 134 or application icon 132.

Figure 6:
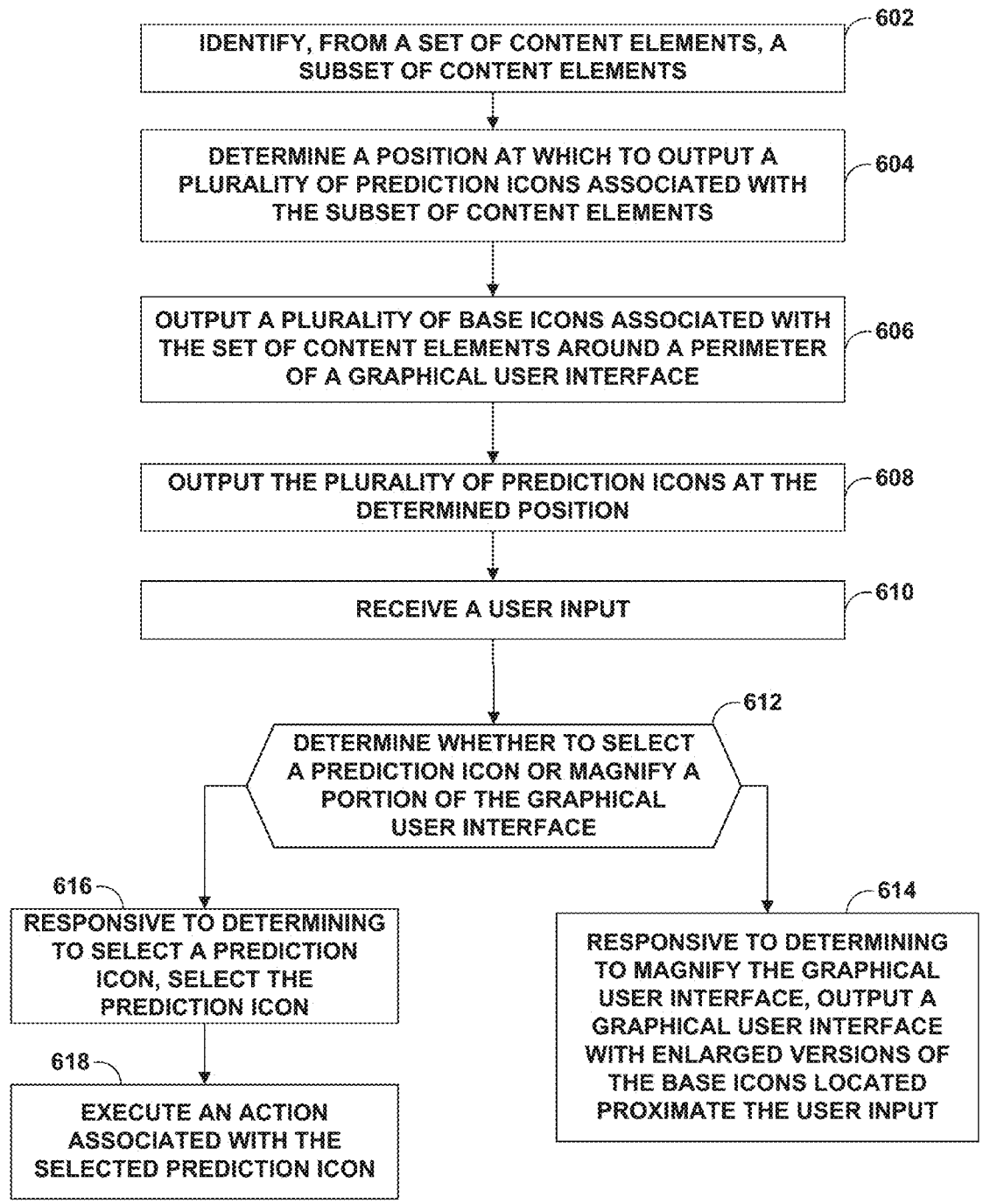
FIG. 6 is a flow diagram illustrating example operations of a computing device for outputting prediction icons, in accordance with one or more aspects of the present disclosure.

FIG. 6 is a flow diagram illustrating example operations of a computing device for outputting prediction icons, in accordance with one or more aspects of the present disclosure. The process of FIG. 6 may be performed by one or more processors of a computing device, such as computing device 110 of FIG. 1 and/or computing device 210 of FIG. 2. The steps of the process of FIG. 6 may in some examples, be repeated, omitted, and/or performed in any order. For purposes of illustration only, the process of FIG. 6 is below within the context of computing device 110 of FIG. 1.

Computing device 110 may output a plurality of base icons around the perimeter of a graphical user interface and a set of prediction icons within the interior of the graphical user interface, the interior being bounded by the perimeter of the graphical user interface. As described above, in some example, the base icons may represent a set of applications and may be referred to as a plurality of application icons 132. Likewise, as described above, the prediction icons may represent a subset of the applications. However, in other examples, the plurality of base icons may represent content other than applications. For example, the plurality of base icons may represent a set of content elements such as contacts, internet bookmarks, songs, folders, actions/operations, etc. Similarly, the prediction icons may represent a subset of the content, such as a subset of the contacts, a subset of internet bookmarks, a subset of songs, a subset of folders, etc.

In some examples, prediction module 126 may identify, from a set of content elements, a subset of the content elements (602). For example, prediction module 126 may identify the subset of content elements by predicting content elements likely to be selected by a user of computing device 110. Prediction module 126 may predict the content elements likely to be selected by a user based on history information (e.g., most frequently selected content or most recently selected content), degree of relatedness between content, and/or contextual information (e.g., day, time, location, sensor data, etc.).

Icon management module 128 may determine a position at which to output a plurality of prediction icons associated with the subset of content elements (604). The position of the prediction icons may be based on a position of respective, corresponding base icons. For example, icon management module 128 may determine to position each prediction icon proximate a corresponding base icon. In some examples, icon management module 128 may determine the position for each prediction icon based on minimizing the distance between a particular prediction icon and a corresponding particular base icon. In some examples, icon management module 128 may determine the position for each prediction icon based on minimizing the total distance between each prediction icon and the respective corresponding base icons.

Presence-sensitive display 112 may output a plurality of base icons associated with the set of content elements around at least a portion of the perimeter of a graphical user interface (606). In some instances, presence-sensitive display 112 may output the base icons around the entire perimeter of the graphical user interface. In other instances, presence-sensitive display 112 may output the base icons around a portion of the perimeter of the graphical user interface. Presence-sensitive display 112 may output the plurality of prediction icons within an interior of the graphical user interface (608). Presence-sensitive display 112 may output the prediction icons at the positions determined by icon management module 128.

Presence-sensitive display 112 may receive a user input (610). Computing device 110 may determine whether to select a prediction icon or magnify a portion of the graphical user interface based on the user input (612). In some examples, computing device 110 may make the determination based on a first distance between the location of the user input and a position of a particular prediction icon and a second distance between the location of the user input and a position of a particular base icon. For example, if the first distance is less than the second distance, computing device 110 may determine to select the particular prediction icon. However, if the second distance is less than the first distance, computing device 110 may determine to magnify the base icons located proximate the user input. In other examples, computing device 110 may make the determination based on a first proportion of a region of the user input that overlaps a particular prediction icon and a second proportion of a region of the user input that overlaps a particular base icon. For example, if the first proportion is greater than the second proportion, computing device 110 may determine to select the particular prediction icon. However, if the second proportion is greater than the first proportion, computing device 110 may determine to magnify the base icons located proximate the user input.

Responsive to determining to magnify a portion of the graphical user interface, presence-sensitive display 112 may output a graphical user interface with enlarged versions of the base icons located proximate to the user input (614). After outputting the magnified graphical user interface, computing device 110 may receive a second user input to select an enlarged base icon and may execute an action associated with the selected base icon.

Responsive to determining to select a prediction icon, computing device 110 may select a particular prediction icon (616) and execute an action associated with the selected prediction icon (618). For example, UI module 114 may cause computing device 110 to launch an application associated with the particular prediction icon or output a graphical user interface that includes a menu of options associated with the prediction icon. For instance, if the prediction icon represents a contact, UI module 114 may cause computing device 110 to output a menu of options such as call, text, or email the contact. In another instance, if the prediction icon represents a song, UI module 114 may cause computing device 110 to play the song.

Example 1

A method comprising identifying, by a computing device and from a set of applications, a subset of the set of applications, each application from the subset of the set of applications being predicted, by the computing device, to be selected by a user; outputting, by the computing device and for display, a graphical user interface comprising: a plurality of application icons representing the set of applications, wherein: each respective application icon from the plurality of application icons represent a respective application from the set of applications, and the plurality of application icons is positioned around at least a portion of a perimeter of the graphical user interface; and a plurality of prediction icons positioned within an interior of the graphical user interface, wherein: the interior of the graphical user interface is bounded by the perimeter of the graphical user interface, the plurality of prediction icons represent the subset of the set of applications, each respective prediction icon from the plurality of prediction icons represents a respective application from the subset of the set of applications, and a position of a particular prediction icon representing a particular application from the subset of the set of applications is based on a position of a particular application icon from the set of application icons representing the particular application; and responsive to receiving an indication of user input to select the particular prediction icon or one of the plurality of application icons, executing, by the computing device, an action associated with the particular prediction icon or the one of the plurality of application icons.

Example 2

The method of Example 1, further comprising determining, by the computing device, a set of candidate distances, wherein each respective candidate distance of the set of candidate distances is based on a respective candidate position for the particular icon and a respective candidate position for the particular application icon; selecting, by the computing device, a shortest candidate distance from the set of candidate distances; and wherein outputting the graphical user interface comprises outputting, by the computing device and based on the shortest candidate distance, the particular prediction icon proximate to the particular application icon.

Example 3

The method of Example 1, wherein each respective prediction icon of the plurality of prediction icons corresponds to a respective application icon, the method further comprising: determining, by the computing device, respective sets of candidate distances for each of the plurality of prediction icons, wherein each respective candidate distance of a respective set of candidate distances is based on a respective candidate position for the each prediction icon and a respective position for each respective, corresponding application icon; minimizing, by the computing device, a total distance that comprises a sum of respective candidate distances from each respective prediction icon of the plurality of prediction icons to each respective, corresponding application icon, the respective candidate distances included in the respective sets of candidate distances, and wherein outputting the graphical user interface comprises outputting, by the computing device and based on the total distance, each respective prediction icon of the plurality of prediction icons proximate to each respective, corresponding application icon.

Example 4

The method of Examples 3, further comprising: weighting, by the computing device, the respective candidate distances for each of the plurality of prediction icons based on a probability of the respective prediction icon being selected, wherein the total distance comprises a sum of the weighted respective candidate distances.

Example 5

The method of any of Examples 1-4, further comprising: responsive to receiving an indication of user input to magnify a region of the graphical user interface proximate a particular location corresponding to the user input, outputting, by the computing device, an enlarged version of the region of the graphical user interface that includes the particular location corresponding to the user input.

Example 6

The method of any of Examples 1-5, further comprising: determining, by the computing device, a first distance between a location of the particular prediction icon and a particular location of the user input; determining, by the computing device, a second distance between a location of an application icon and the particular location of the user input; and responsive to determining that the first distance is less than the second distance, selecting, by the computing device, the particular prediction icon.

Example 7

The method of any of Examples 1-6, further comprising: determining, by the computing device, a first proportion of a region of the user input that overlaps with the particular prediction icon; determining, by the computing device, a second proportion of a region of the user input that overlaps with an application icon; and responsive to determining that first proportion is greater than the second proportion, selecting, by the computing device, the particular prediction icon.

Example 8

A computing device comprising: one or more computer processors; a memory comprising instructions that when executed by the one or more computer processors cause the one or more computer processors to: identify, from a set of applications, a subset of the set of applications, each application from the subset of the set of applications being predicted by the computing device to be selected by a user; output, for display, a graphical user interface comprising: a plurality of application icons representing the set of applications, wherein: each respective application icon from the plurality of application icons represents a respective application from the set of applications, and the plurality of application icons is positioned around at least a portion of a perimeter of the graphical user interface; and a plurality of prediction icons positioned within an interior of the graphical user interface, wherein: the interior of the graphical user interface is bounded by the perimeter of the graphical user interface, the plurality of prediction icons represent the subset of the set of applications, each respective prediction icon from the plurality of prediction icons represents a respective application from the subset of the set of applications, and a position of a particular prediction icon representing a particular application from the subset of the set of applications is based on a position of a particular application icon from the set of application icons representing the particular application; and responsive to receiving an indication of user input to select the particular prediction icon or one of the plurality of application icons, execute an action associated with the particular prediction icon or the one of the plurality of application icons.

Example 9

The computing device of Example 8, wherein the memory comprises instructions that when executed by the one or more computer processors cause the one or more computer processors to: determine a set of candidate distances, wherein each respective candidate distance of the set of candidate distances is based on a respective candidate position for the particular prediction icon and a respective position for the particular application icon; and select a shortest candidate distance from the set of candidate distances, wherein outputting the graphical user interface comprises outputting, based on the shortest candidate distance, the particular prediction icon proximate to the particular application icon.

Example 10

The computing device of Example 8, wherein each respective prediction icon of the plurality of prediction icons corresponds to a respective application icon, wherein the memory comprises instructions that when executed by the one or more computer processors cause the one or more computer processors to: determine respective sets of candidate distances for each of the plurality of prediction icons, wherein each respective candidate distance of a respective set of candidate distances is based on a respective candidate position for the each prediction icon and a respective position for each respective, corresponding application icon; and minimize a total distance that comprises a sum of respective candidate distances from each respective prediction icon of the plurality of prediction icons to each respective, corresponding application icon, the respective candidate distances included in the respective sets of candidate distances, wherein outputting the graphical user interface comprises outputting, based on the total distance, each respective prediction icon of the plurality of prediction icons proximate to each respective, corresponding application icon.

Example 11

The computing device of Example 10, wherein the memory comprises instructions that when executed by the one or more computer processors cause the one or more computer processors to: weight the respective candidate distances for each of the plurality of prediction icons based on a probability of the respective prediction icon being selected, wherein the total distance comprises a sum of the weighted respective candidate distances.

Example 12

The computing device of any of Examples 8-11, wherein the memory comprises instructions that when executed by the one or more computer processors cause the one or more computer processors to: responsive to receiving an indication of user input to magnify a region of the graphical user interface proximate a particular location corresponding to the user input, output an enlarged version of the region of the graphical user interface that includes the particular location corresponding to the user input.

Example 13

The computing device of any of Examples 8-12, wherein the memory comprises instructions that when executed by the one or more computer processors cause the one or more computer processors to: determine a first distance between a location of the particular prediction icon and a particular location of the user input; determine a second distance between a location of an application icon and the particular location of the user input; and responsive to determining that the first distance is less than the second distance, select the particular prediction icon.

Example 14

The computing device of any of Examples 8-13, wherein the memory comprises instructions that when executed by the one or more computer processors cause the one or more computer processors to: determine a first proportion of a region of the user input that overlaps with the particular prediction icon; determine a second proportion of a region of the user input that overlaps with an application icon; and responsive to determining that first proportion is greater than the second proportion, select the particular prediction icon.

Example 15

A non-transitory computer-readable storage medium encoded with instructions that, when executed, cause at least one processor of a computing device for a user to: identify, from a set of content elements, a subset of the set of content elements, each content element from the subset of the set of content elements being predicted, by the computing device, to be selected by a user; output, for display, a graphical user interface comprising: a plurality of base icons representing the set of content elements, wherein: each respective base icon from the plurality of base icons represents a respective content element from the set of content elements, and the plurality of base icons is positioned around at least a portion of a perimeter of the graphical user interface; and a plurality of prediction icons positioned within an interior of the graphical user interface, wherein: the interior of the graphical user interface is bounded by the perimeter of the graphical user interface, the plurality of prediction icons representing the subset of the set of content elements, each respective prediction icon from the plurality of prediction icons represents a respective content element from the subset of content elements, and a position of a particular prediction icon for a particular content element from the subset of the set of content elements is based on a position of a particular base icon from the set of base icons representing the particular content element; and responsive to receiving an indication of user input to select the particular prediction icon or one of the plurality of base icons, execute an action associated with the particular prediction icon or the one of the plurality of base icons.

Example 16

The non-transitory computer-readable storage medium of Example 15 encoded with instructions that, when executed, cause at least one processor of the computing device to: determine a set of candidate distances, wherein each respective candidate distance of the set of candidate distances is based on a respective candidate position for the particular prediction icon and a respective position for the particular base icon; and select a shortest candidate distance from the set of candidate distances, wherein outputting the graphical user interface comprises outputting, based on the shortest candidate distance, the particular prediction icon proximate to the particular base icon.

Example 17

The non-transitory computer-readable storage medium of Example 15, wherein each respective prediction icon of the plurality of prediction icons corresponds to a respective base icon, wherein the non-transitory computer-readable storage medium is further encoded with instructions that, when executed, cause the at least one processor of the computing device to: determine respective sets of candidate distances for each of the plurality of prediction icons, wherein each respective candidate distance of a respective set of candidate distances is based on a respective candidate position for the each prediction icon and a respective position for each respective, corresponding base icon; and minimize a total distance that comprises a sum of respective candidate distances from each respective prediction icon of the plurality of prediction icons to each respective, corresponding base icon, the respective candidate distances included in the respective sets of candidate distances, wherein outputting the graphical user interface comprises outputting, based on the total distance, each respective prediction icon of the plurality of prediction icons proximate to each respective, corresponding base icon.

Example 18

The non-transitory computer-readable storage medium of any of Example 17, encoded with instructions that, when executed, cause the at least one processor of the computing device to: weight the respective candidate distances for each of the plurality of prediction icons based on a probability of the respective prediction icon being selected, wherein the total distance comprises a sum of the weighted respective candidate distances.

Example 19

The non-transitory computer-readable storage medium of any of Examples 15-18 encoded with instructions that, when executed, cause the at least one processor of the computing device to: responsive to receiving an indication of user input to magnify a region of the graphical user interface proximate a particular location corresponding to the user input, output an enlarged version of the region of the graphical user interface that includes the particular location corresponding to the user input.

Example 20

The non-transitory computer-readable storage medium of any of Examples 15-18 encoded with instructions that, when executed, cause the at least one processor of the computing device to: determine a first distance between a location of the particular prediction icon and a particular location of the user input; determine a second distance between a location of an base icon and the particular location of the user input; and responsive to determining that the first distance is less than the second distance, select the particular prediction icon.

Example 21

A device comprising means for performing any combination of the techniques of examples 1-7.

In one or more examples, the functions described may be implemented in hardware, software, firmware, or any combination thereof. If implemented in software, the functions may be stored on or transmitted over, as one or more instructions or code, a computer-readable medium and executed by a hardware-based processing unit. Computer-readable media may include computer-readable storage media, which corresponds to a tangible medium such as data storage media, or communication media including any medium that facilitates transfer of a computer program from one place to another, e.g., according to a communication protocol. In this manner, computer-readable media generally may correspond to (1) tangible computer-readable storage media, which is non-transitory or (2) a communication medium such as a signal or carrier wave. Data storage media may be any available media that can be accessed by one or more computers or one or more processors to retrieve instructions, code and/or data structures for implementation of the techniques described in this disclosure. A computer program product may include a computer-readable medium.

By way of example, and not limitation, such computer-readable storage media can comprise RAM, ROM, EEPROM, CD-ROM or other optical disk storage, magnetic disk storage, or other magnetic storage devices, flash memory, or any other medium that can be used to store desired program code in the form of instructions or data structures and that can be accessed by a computer. Also, any connection is properly termed a computer-readable medium. For example, if instructions are transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of medium. It should be understood, however, that computer-readable storage media and data storage media do not include connections, carrier waves, signals, or other transient media, but are instead directed to non-transient, tangible storage media. Disk and disc, as used, includes compact disc (CD), laser disc, optical disc, digital versatile disc (DVD), floppy disk and Blu-ray disc, where disks usually reproduce data magnetically, while discs reproduce data optically with lasers. Combinations of the above should also be included within the scope of computer-readable media.

Instructions may be executed by one or more processors, such as one or more digital signal processors (DSPs), general purpose microprocessors, application specific integrated circuits (ASICs), field programmable logic arrays (FPGAs), or other equivalent integrated or discrete logic circuitry. Accordingly, the term "processor," as used may refer to any of the foregoing structure or any other structure suitable for implementation of the techniques described. In addition, in some aspects, the functionality described may be provided within dedicated hardware and/or software modules. Also, the techniques could be fully implemented in one or more circuits or logic elements.

The techniques of this disclosure may be implemented in a wide variety of devices or apparatuses, including a wireless handset, an integrated circuit (IC) or a set of ICs (e.g., a chip set). Various components, modules, or units are described in this disclosure to emphasize functional aspects of devices configured to perform the disclosed techniques, but do not necessarily require realization by different hardware units. Rather, as described above, various units may be combined in a hardware unit or provided by a collection of interoperative hardware units, including one or more processors as described above, in conjunction with suitable software and/or firmware.

It is to be recognized that depending on the embodiment, certain acts or events of any of the methods described herein can be performed in a different sequence, may be added, merged, or left out altogether (e.g., not all described acts or events are necessary for the practice of the method). Moreover, in certain embodiments, acts or events may be performed concurrently, e.g., through multi-threaded processing, interrupt processing, or multiple processors, rather than sequentially.

In some examples, a computer-readable storage medium includes a non-transitory medium. In some examples, the term "non-transitory" indicates that the storage medium is not embodied in a carrier wave or a propagated signal. In certain examples, a non-transitory storage medium stores data that can, over time, change (e.g., in RAM or cache). Although certain examples are described as outputting various information for display, techniques of the disclosure may output such information in other forms, such as audio, holographical, or haptic forms, to name only a few examples, in accordance with techniques of the disclosure.

Various examples have been described. These and other examples are within the scope of the following claims.

What is claimed is:

1. A method comprising:
   outputting, by a computing device and for display, a graphical user interface that includes a first plurality of icons positioned around at least a portion of a perimeter of the graphical user interface, each icon of the first plurality of icons representing a respective application of a set of applications installed at the computing device and being located at a respective pre-defined display position;
   predicting, by the computing device and from the set of applications, a subset of applications likely to be selected by a user;
   determining, by the computing device, a total distance for each respective combination of candidate positions and icons of a second plurality of icons, wherein each respective total distance is based on a distance from each candidate display position for each icon of the second plurality of icons to a respective pre-defined display position for each respective, corresponding icon of the first plurality of icons, wherein each icon of the second plurality of icons corresponds to a respective icon of the first plurality of icons and represents an application that is also represented by the respective, corresponding icon of the first plurality of icons;
   selecting, by the computing device, the combination of candidate positions and icons of the second plurality of icons having the shortest total distance between each respective icon of the second plurality of icons to each respective, corresponding icon of the first plurality of icons;
   outputting, by the computing device and for display, an updated graphical user interface that includes:
      the first plurality of icons located at the respective pre-defined display positions; and
      the second plurality of icons, each icon of the second plurality of icons located at the respective display positions corresponding to the shortest total distance, wherein the second plurality of icons are positioned within an interior of the graphical user interface that is surrounded at least in part by the first plurality of icons; and
   responsive to receiving an indication of user input selecting a particular icon of the second plurality of icons, executing, by the computing device, a particular application corresponding to the particular icon of the second plurality of icons.

2. The method of claim 1, wherein determining the respective total distances further comprises:
   weighting, by the computing device, the distance from each candidate display position for each icon of the second plurality of icons to the respective pre-defined display position for the respective, corresponding icon of the second plurality of icons based on a probability of the respective icon of the second plurality of icons being selected, wherein each total distance comprises a sum of the weighted distances.

3. The method of claim 1, further comprising:
   receiving, by the computing device, an indication of user input magnifying a region of the graphical user interface proximate a particular location of a display device of the computing device; and
   responsive to receiving the indication of the user input magnifying the region of the graphical user interface proximate the particular location of the display device, outputting, by the computing device, an enlarged version of the region of the graphical user interface that includes one or more icons of the first plurality of icons located proximate the particular location of the display device.

4. The method of claim 1, further comprising:
receiving, by the computing device, an indication of user input detected at a particular location of a display device of the computing device;
determining, by the computing device, a distance between a display position of the particular icon of the second plurality of icons and the particular location of the display device;
determining, by the computing device, a distance between a display position of a particular icon of the first plurality of icons and the particular location of the display device; and
responsive to determining that the first distance between the display position of the particular icon of the second plurality of icons and the particular location of the display device is less than the distance between the display position of a particular icon of the first plurality of icons and the particular location of the display device, selecting, by the computing device, the particular icon of the second plurality of icons.

5. The method of claim 1, further comprising:
receiving, by the computing device, an indication of user input detected at a region of a display device of the computing device;
determining, by the computing device, a proportion of the region of the display device that overlaps with the particular icon of the second plurality of icons;
determining, by the computing device, a proportion of the region of the display device that overlaps with a particular icon of the first plurality of icons; and
responsive to determining that the proportion of the region of the display device that overlaps with the particular icon of the second plurality of icons is greater than the proportion of the region of the display device that overlaps with a particular icon of the first plurality of icons, selecting, by the computing device, the particular icon of the second plurality of icons.

6. A computing device comprising:
one or more computer processors;
a memory comprising instructions that when executed by the one or more computer processors cause the one or more computer processors to:
output, for display, a graphical user interface that includes a first plurality of icons positioned around at least a portion of a perimeter of the graphical user interface, each icon of the first plurality of icons representing a respective application of a set of applications installed at the computing device and being located at a respective pre-defined display position;
predict, from the set of applications, a subset of applications likely to be selected by a user;
determine a total distance for each respective combination of candidate positions and icons of a second plurality of icons, wherein each respective total distance is based on a distance from each candidate display position for each icon of the second plurality of icons to a respective pre-defined display position for each respective, corresponding icon of the first plurality of icons, wherein each icon of the second plurality of icons corresponds to a respective icon of the first plurality of icons and represents an application that is also represented by the respective, corresponding icon of the first plurality of icons;
select the combination of candidate positions and icons of the second plurality of icons having the shortest total distance between each respective icon of the second plurality of icons to each respective, corresponding icon of the first plurality of icons;
output, for display, an updated graphical user interface that include:
the first plurality of icons located at the respective pre-defined display positions; and
the second plurality of icons, each icon of the second plurality of icons located at the respective display positions corresponding to the shortest total distance, wherein the second plurality of icons are positioned within an interior of the graphical user interface that is surrounded at least in part by the first plurality of icons; and
responsive to receiving an indication of user input selecting a particular icon of the second plurality of icons, execute a particular application corresponding to the particular icon of the second plurality of icons.

7. The computing device of claim 6, wherein the memory comprises instructions that when executed by the one or more computer processors cause the one or more computer processors to determine the respective total distances by at least causing the one or more computer processors to:
weight the distance from each candidate display position for each icon of the second plurality of icons to the respective pre-defined display position for the respective, corresponding icon of the second plurality of icons based on a probability of the respective icon of the second plurality of icons being selected,
wherein each total distance comprises a sum of the weighted distances.

8. The computing device of claim 6, wherein the memory comprises instructions that when executed by the one or more computer processors cause the one or more computer processors to:
receive an indication of user input magnifying a region of the graphical user interface proximate a particular location of a display device of the computing device; and
responsive to receiving the indication of the user input magnifying the region of the graphical user interface proximate the particular location of the display device, output an enlarged version of the region of the graphical user interface that includes one or more icons of the first plurality of icons located proximate the particular location of the display device.

9. The computing device of claim 6, wherein the memory comprises instructions that when executed by the one or more computer processors cause the one or more computer processors to:
receiving, by the computing device, an indication of user input detected at a particular location of a display device of the computing device;
determine a distance between a display position of the particular of the second plurality of icons and the particular location of the display device;
determine a distance between a display position of a particular icon of the first plurality of icons and the particular location of the display device; and
responsive to determining that the distance between the display position of the particular icon of the second plurality of icons and the particular location of the display device is less than the distance between the display position of a particular icon of the first plurality of icons and the particular location of the display device, select the icon of the second plurality of icons.

10. The computing device of claim 6, wherein the memory comprises instructions that when executed by the one or more computer processors cause the one or more computer processors to:
receiving, by the computing device, an indication of user input detected at a particular region of a display device of the computing device;
determine a proportion of the region of the display device that overlaps with the particular icon of the second plurality of icons;
determine a proportion of the region of the display device that overlaps with a particular icon of the first plurality of icons; and
responsive to determining that the proportion of the region of the display device that overlaps with the particular icon of the second plurality of icons is greater than the proportion the region of the display device that overlaps with a particular icon of the first plurality of icons, select the particular icon of the second plurality of icons.

11. A non-transitory computer-readable storage medium encoded with instructions that, when executed, cause at least one processor of a computing device to:
output, for display, a graphical user interface that includes a first plurality of icons positioned around at least a portion of a perimeter of the graphical user interface, each icon of the first plurality of icons representing a respective content element of a set of content elements and being located at a respective pre-defined display position;
predict, from the set of content elements, a subset of content elements likely to be selected by a user;
determine a total distance for each respective combination of candidate positions and icons of the second plurality of icons, wherein each respective total distance is based on a distance from each candidate display position for each icon of the second plurality of icons to a respective pre-defined display position for each respective, corresponding icon of the first plurality of icons, wherein each icon of the second plurality of icons corresponds to a respective icon of the first plurality of icons and represents a content element that is also represented by the respective, corresponding icon of the first plurality of icons;
selecting, by the computing device, the combination of candidate positions and icons of the second plurality of icons having the shortest total distance between each respective icon of the second plurality of icons to each respective, corresponding icon of the first plurality of icons;
output, for display, an updated graphical user interface that includes:
the first plurality of icons located at the respective pre-defined display positions; and
the second plurality of icons, each icon of the second plurality of icons located at the respective display positions corresponding to the shortest total distance, wherein the second plurality of icons are positioned within an interior of the graphical user interface that is surrounded at least in part by the first plurality of icons; and
responsive to receiving an indication of user input selecting a particular icon of the second plurality of icons, execute an action associated with the particular icon of the second plurality of icons.

12. The non-transitory computer-readable storage medium of claim 11 encoded with instructions that, when executed, cause the at least one processor of the computing device to:
weight the distance from each candidate display position for each icon of the second plurality of icons to the respective pre-defined display position for the respective, corresponding icon of the second plurality of icons based on a probability of the respective icon of the second plurality of icons being selected,
wherein each total distance comprises a sum of the weighted distances.

13. The non-transitory computer-readable storage medium of claim 11 encoded with instructions that, when executed, cause the at least one processor of the computing device to:
receive an indication of user input magnifying a region of the graphical user interface proximate a particular location of a display device of the computing device; and
responsive to receiving the indication of the user input magnifying the region of the graphical user interface proximate the particular location of the display device, output an enlarged version of the region of the graphical user interface that includes one or more icons of the first plurality of icons located proximate the particular location of the display device.

14. The non-transitory computer-readable storage medium of claim 11 encoded with instructions that, when executed, cause the at least one processor of the computing device to:
receiving, by the computing device, an indication of user input detected at a particular location of a display device of the computing device;
determine a distance between a display position of the particular icon of the first plurality of icons and the particular location of the display device;
determine a distance between a display position of a particular icon of the first plurality of icons and the particular location of the display device; and
responsive to determining that the distance between the display position of the particular icon of the second plurality of icons and the particular location of the display device is less than the distance between the display position of a particular icon of the first plurality of icons and the particular location of the display device, select the particular icon of the second plurality of icons.

15. The method of claim 1, further comprising:
responsive to changing the set of applications installed at the computing device, determining, by the computing device, an updated display position for each icon of the first plurality of icons.

16. The method of claim 1, wherein each icon the second plurality of icons of the updated graphical user interface is larger than the respective, corresponding icon of the first plurality of icons.

17. The computing device of claim 6, wherein the memory comprises instructions that when executed by the one or more computer processors cause the one or more computer processors to:
responsive to changing the set of applications installed at the computing device, determining, by the computing device, an updated display position for each icon of the first plurality of icons.

18. The computing device of claim 6, wherein each icon the second plurality of icons of the updated graphical user interface is larger than the respective, corresponding icon of the first plurality of icons.

19. The non-transitory computer-readable storage medium of claim 11, wherein each icon the second plurality of icons of the updated graphical user interface is larger than the respective, corresponding icon of the first plurality of icons.

* * * * *